United States Patent
Yoshida et al.

[11] Patent Number: 5,817,731
[45] Date of Patent: Oct. 6, 1998

[54] COATING COMPOSITION AND METHOD FOR PRODUCING PRECOATED STEEL SHEETS

[75] Inventors: Kenji Yoshida; Takashi Anyashiki; Kazumi Itou; Shouichi Oosuka, all of Tokyo, Japan

[73] Assignee: NKK Corporation, Tokyo, Japan

[21] Appl. No.: 707,249

[22] Filed: Sep. 3, 1996

[51] Int. Cl.$^6$ .................................................. C08G 18/80
[52] U.S. Cl. .............................. 528/45; 528/74; 427/409; 428/425.8; 428/425.9
[58] Field of Search ................ 528/74, 45; 427/409; 428/425.8, 425.9

[56] References Cited

U.S. PATENT DOCUMENTS

| | | | |
|---|---|---|---|
| 5,418,309 | 5/1995 | Tanabe et al. | 528/45 |
| 5,543,475 | 8/1996 | Jones et al. | 525/444 |

FOREIGN PATENT DOCUMENTS

| | | |
|---|---|---|
| 56-18032 | 4/1981 | Japan . |
| 59-11370 | 7/1984 | Japan . |
| 62-195057 | 8/1987 | Japan . |
| 62-236817 | 10/1987 | Japan . |
| 63-108081 | 5/1988 | Japan . |
| 90012250 | 3/1990 | Japan . |
| 2-209979 | 8/1990 | Japan . |
| 3-500544 | 2/1991 | Japan . |
| 6-506243 | 7/1994 | Japan . |
| 6-234752 | 8/1994 | Japan . |

*Primary Examiner*—Rachel Gorr
*Attorney, Agent, or Firm*—Nields, Lemack & Dingman

[57] ABSTRACT

This invention relates to a coating composition for precoated steel sheets which are required to have high hardness, high workability and high distinctness of image, and to a method for producing a precoated steel sheet having a coating film of the composition. The composition is prepared by adding a compound of any of the following (a) to (c) to a coating composition consisting essentially of a polyol and containing, as the curing agent, an isocyanate compound or an amino resin, and the coating film of the composition has both high-level workability and high-level hardness.

(a) Polyester compounds comprising main repeating units of a general formula (1):

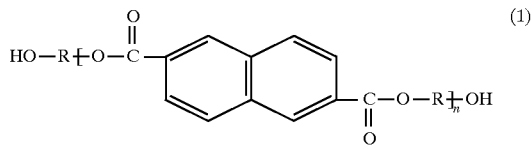

wherein n is an integer; and R is an alkylene group having 10 or less carbon atoms, or a 1,4-cyclohexylene-dimethylene group, or a neopentylene group, or a polyoxyalkylene group.

(b) Polyester compounds comprising main repeating units of a general formula (2):

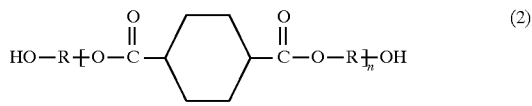

wherein n is an integer of 10 or less; and R is an alkylene group having 10 or less carbon atoms, or a 1,4-cyclohexylene-dimethylene group, or a neopentylene group.

(c) Compounds having the structure of a general formula (3):

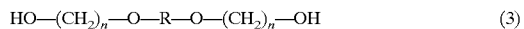

wherein n is an integer of from 2 to 10; and R is

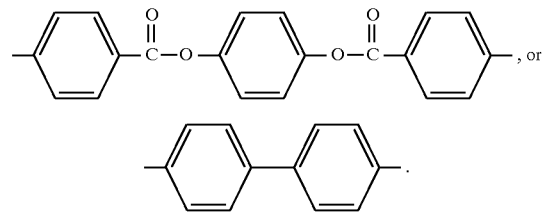

40 Claims, No Drawings

COATING COMPOSITION AND METHOD FOR PRODUCING PRECOATED STEEL SHEETS

TECHNICAL FIELD OF THE INVENTION

The present invention relates to a thermosetting coating composition for precoated steel sheets which are required to have high hardness, high workability and high distinctness of image, and to a method for producing precoated steel sheets by forming a coat of the composition on the surface of a steel sheet. The precoated steel sheets having thereon the coat of the composition of the invention are suitable for use in household electric appliances and as construction materials, and also can be used in producing vehicles.

BACKGROUND ART

Coating compositions for precoated steel sheets are required to have various properties, such as high hardness, high workability, stain resistance, chemical resistance, waterproofness and distinctness of image. Of these, the hardness and the workability are important characteristics, which, however, are contradictory to each other but the levels of which are required to be high. The workability as referred to herein indicates that, when flat, coated metal sheets are worked into various shaped structures through bending, cutting or drawing, the paint films are damaged little. Therefore, it shall be said that the larger the degrees of elongation and flexibility of paint films themselves, the better the workability of the paint films. On the other hand, it is desirable that the hardness of paint films is higher in order to make them have higher durability, while paint films having higher hardness tend to have lower workability.

Regarding coating compositions for precoated steel sheets, polyester resins and epoxy resins have heretofore been used essentially in undercoating compositions for outside faces and in coating compositions for back sides, while polyester, acrylic or polyvinyl coating compositions in overcoating compositions for outside faces. Polyester resin coating compositions comprising a combination of polyester resins (main ingredients) and melamine compounds (curing agents) are the most typical as overcoating compositions for outside faces, in which the polyester resins give the workability and the melamine compounds give the hardness. However, their properties are not always satisfactory when they are used in precoated steel sheets which are required to have the highest level properties with severity, especially in those for household electric appliances, and therefore, the improvement in the properties of such overcoating compositions for outside faces is required.

Given the situation, various proposals such as those mentioned below have heretofore been made.

Japanese Patent Application Laid-Open No. 62-236817 discloses a resin composition for coating, which comprises a polyester polyol containing, as the glycol component, an alicyclic glycol such as 1,4-cyclohexane-dimethanol, and a blocked prepolymer having NCO at its terminal.

Japanese Patent Application Laid-Open No. 63-108081 discloses a coating composition comprising (i) a polyester polyol, in which the acid component comprises an aromatic dicarboxylic acid including terephthalic acid, and an aliphatic carboxylic acid, and the polyol component comprises ethylene glycol and 1,4-cyclohexane-dimethanol, and (ii) a curing agent.

Japanese Patent Application Laid-Open No. 59-11370 discloses a coating resin composition comprising (i) a combination of two different linear polyesters to be prepared from acid components of terephthalic acid, isophthalic acid and an aliphatic dicarboxylic acid, and glycol components of ethylene glycol and neopentyl glycol, and (ii) a methoxymelamine compound and a butoxymelamine compound as combined with (i).

Japanese Patent Application Laid-Open No. 62-195057 discloses a coating composition for precoated steel sheets, which comprises (i) an urethane polymer resulting from the introduction of an urethane bond into a polycondensate of a hydroxyl-having copolyester resin with a polyisocyanate compound, (ii) a hydroxyl-containing copolyester resin, and (iii) an alkyl-etherified melamine resin.

Japanese Patent Application Laid-Open No. 2-209979 discloses a coating composition for precoated steel sheets, which comprises (i) a saturated polyester resin in which the acid component consists essentially of an aromatic dicarboxylic acid (or its ester) and the glycol component comprises an alkylene oxide low-adduct or high-adduct to bisphenol A, and (ii) an alkyl-etherified formaldehyde resin.

Japanese Patent Publication No. 56-18032 discloses a technique of dispersing rubber particles in an acrylic resin composition to thereby reduce the work strain of the film made from the composition.

Japanese PCT Application Laid-Open No. 3-500544 discloses a technique relating to the coating film to be formed by reacting an acrylic polymer or polyester polymer having a mesogen group as bonded thereto through covalent bonding and having a low glass transition point with a curing agent such as an amino resin.

Japanese Patent Laid-Open No. 5-24147 discloses a technical idea of obtaining a coating film with both high-level flexibility and high-level hardness by reacting a polyester resin with a curing agent of a melamine resin which has been modified to have orientability.

However, these prior art techniques have various problems such as those mentioned below.

According to the technique disclosed in Japanese Patent Laid-Open No. 62-236817, it is possible to obtain a coating film with relatively high hardness, but the flexibility of the film at room temperature is unsatisfactory. The technique disclosed in Japanese Patent Laid-Open No. 63-108081 is problematic in that the xylol resistance of the film to be formed from the composition is not good.

The technique disclosed in Japanese Patent Publication No. 56-18032 is to reduce the work strain of the film made from the composition. However, it is difficult to say that, when the composition is used in producing precoated steel sheets, the balance between the elongation and the hardness of the coating film is good.

The technique disclosed in Japanese PCT Application Laid-Open No. 3-500544 is difficult to apply to precoated steel sheets in view of the costs for producing the mesogen-modified polymers, the components that constitute the coating film, and the curing conditions. In addition, this techniques does not include any means of improving the flexibility of the coating film.

The technique disclosed in Japanese Patent Laid-Open Application No. 5-24147 requires complicated steps for producing the modified melamine compounds. At present, any practicable resins cannot be obtained according to this technique.

The techniques disclosed in Japanese Patent Application Laid-Open Nos. 59-11370, 62-195057 and 2-209970 could not satisfy both the high workability and the high hardness that are necessary to the films of precoated steel sheets.

As has been mentioned hereinabove, many of the prior art techniques are to improve the resins themselves that shall be the essential components in coating films, thereby enhancing the hardness and the workability of the films. In general, however, the hardness and the workability of coating films are contradictory to each other. Therefore, it was impossible to obtain coating films having high hardness and high workability, according to the prior art techniques mentioned hereinabove.

Given the situation, accordingly, the object of the present invention is to solve various problems in the prior art such as those mentioned hereinabove, and to provide a coating composition for precoated steel sheets which can form a coating film having both high workability and high hardness and which can be prepared with ease, as well as a precoated steel sheet having a coating film formed from the coating composition.

DISCLOSURE OF THE INVENTION

We, the present inventors have assiduously studied in order to obtain a coating composition for precoated steel sheets which has excellent properties and which therefore can solve the above-mentioned problems, and, as a result, have found that, when any of the following compounds (a) to (c) is added to a coating composition consisting essentially of a polyol and containing, as a curing agent, an isocyanate compound or an amino resin, a coating film having both high workability and high hardness and having other excellent properties can be obtained. On the basis of this finding, we have completed the present invention.

(a) Polyester compounds to be obtained by reacting essentially naphthalene-2,6-dicarboxylic acid and/or its lower alkyl ester with an alcohol component. These polyester compounds comprise main repeating units of a general formula (1):

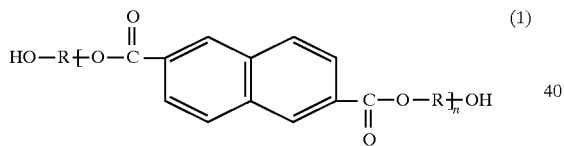

(1)

wherein n represents an integer; and R represents an alkylene group having 10 or less carbon atoms, or a 1,4-cyclohexylene-dimethylene group, or a neopentylene group, or a polyoxyalkylene group.

(b) Polyester compounds to be obtained by reacting essentially 1,4-cyclohexane-dicarboxylic acid and/or its lower alkyl ester with an alcohol component. These polyester compounds comprise main repeating units of a general formula (2):

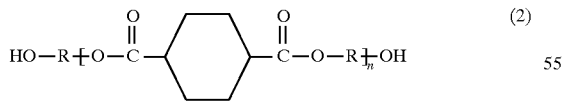

(2)

wherein n represents an integer of 10 or less; and R represents an alkylene group having 10 or less carbon atoms, or a 1,4-cyclohexylene-dimethylene group, or a neopentylene group.

(c) Bifunctional compounds having a rigid dibenzoyloxy-p-phenylene or biphenyl skeleton and hydroxyl groups at the both terminals of the skeleton via a methylene chain. These bifunctional compounds have the structure of a general formula (3):

HO—(CH$_2$)$_n$—O—R—O—(CH$_2$)$_n$—OH (3)

wherein n represents an integer of from 2 to 10; and R represents

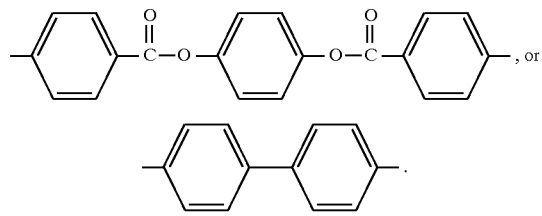

The present invention has been achieved on the basis of these findings, and is characterized by the following constitutions.

(1) A coating composition for precoated steel sheets, which consists essentially of:

i) from 1 to 15% by weight of a polyester compound comprising main repeating units of a general formula:

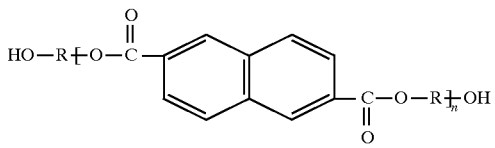

wherein n represents an integer; and R represents an alkylene group having 10 or less carbon atoms, or a 1,4-cyclohexylene-dimethylene group, or a neopentylene group, or a polyoxyalkylene group;

ii) a polyol; and iii) a curing agent.

(2) A coating composition for precoated steel sheets, which consists essentially of:

i) from 1 to 50% by weight of a polyester compound comprising main repeating units of a general formula:

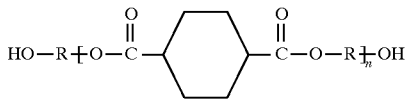

wherein n represents an integer of 10 or less; and R represents an alkylene group having 10 or less carbon atoms, or a 1,4-cyclohexylene-dimethylene group, or a neopentylene group;

ii) a polyol; and iii) a curing agent.

(3) A coating composition for precoated steel sheets, which consists essentially of:

i) from 1 to 15% by weight of a compound having the structure of a general formula:

HO—(CH$_2$)$_n$—O—R—O—(CH$_2$)$_n$—OH wherein n represents an integer of from 2 to 10; and R represents

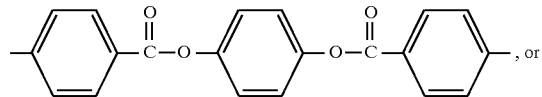

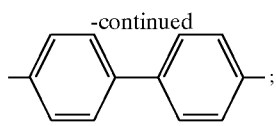

ii) a polyol; and iii) a curing agent.

Another characteristic aspect of the present invention is a method for producing precoated steel sheets by forming a coating film of any of the above-mentioned coating compositions (1) to (3) on the surface of a steel sheet.

DETAILED DESCRIPTION OF THE INVENTION

The coating composition for precoated steel sheets of the present invention consists essentially of i) a particular compound, ii) a polyol, and iii) a curing agent.

As the compound of the above-mentioned i), any of the above-mentioned compounds (a) to (c) can be used. Therefore, the details of the coating composition for precoated steel sheets of the present invention are described hereinunder for each of these three compounds (a) to (c).

The first coating composition for precoated steel sheets of the present invention consists essentially of:

i) from 1 to 15% by weight of a polyester compound comprising main repeating units of a general formula:

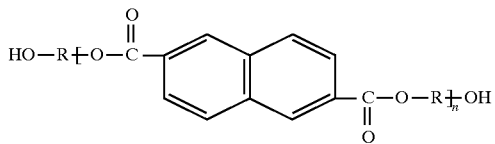

wherein n represents an integer; and R represents an alkylene group having 10 or less carbon atoms, or a 1,4-cyclohexylene-dimethylene group, or a neopentylene group, or a polyoxyalkylene group;

ii) a polyol; and iii) a curing agent.

The polyester compound of the above-mentioned i) can be obtained by reacting an acid component, naphthalene-2,6-dicarboxylic acid and/or its lower alkyl ester, with an alcohol component.

The amount of this polyester compound to be in the coating composition shall be from 1 to 15% by weight, preferably from 2 to 10% by weight, more preferably from 3 to 8% by weight, relative to the solid content of the composition. If the polyester content is less than 1% by weight, the properties of the coating film to be formed from the composition are not good and are superior little to those of conventional coating films. On the other hand, if it is more than 15% by weight, the solubility of the composition in solvents is low, and the compatibility of the polyester compound with the polyol and the curing agent is poor, and, in addition, both the outward appearance of the coating film to be formed from the composition and the properties of the film are not good.

The acid component to be used to give the polyester compound of the above-mentioned i) consists essentially of naphthalene-2,6-dicarboxylic acid and/or its lower alkyl ester, but a part of this can be substituted with any of carboxylic acids such as terephthalic acid, isophthalic acid, naphthalene-2,7-dicarboxylic acid and diphenyldicarboxylic acid, and lower alkyl esters of such dicarboxylic acids. The lower alkyl ester includes, for example, methyl esters and ethyl esters having 1 or 2 carbon atoms. However, it is still desirable that the essential constituent, naphthalene-2,6-dicarboxylic acid accounts for 85 mol % or more of the whole acid component, while the proportion of the other substitutable compounds is less than 15 mol %.

Next, the alcohol component consists essentially of a diol. The diol may be any of aliphatic diols and alicyclic diols, including, for example, ethylene glycol, propylene glycol, 1,4-butanediol, 1,6-hexanediol, neopentyl glycol, and 1,4-cyclohexane-dimethanol. Also usable are polyoxyalkylene glycols, especially those having a mean molecular weight of 1200 or less, more preferably polyethylene glycol (hereinafter referred to as PEG) having a mean molecular weight of 1000 or less, or polytetraethylene glycol (hereinafter referred to as PTG) having a mean molecular weight of 1000 or less. Mixtures of these can also be used.

The alcohol component is reacted with the acid component to give the polyester compound of the above-mentioned i). Where PEG having a mean molecular weight of 1200 or less or PTG having a molecular weight of 1000 or less is used, obtained are polyester compounds with ether bonds.

The polyester compound of the above-mentioned i) for use in the present invention can be obtained through ordinary polyester production, such as interesterification or direct esterification. In general, the acid component reacts with the alcohol component in a molar ratio of 1:2. Therefore, in order to effect the reaction efficiently, it is desirable to combine the acid component and the alcohol component in a ratio as near as possible to such a molar ratio of 1:2. The polyester compound can be used either singly or in the form of a mixture of two or more of the compounds.

The polyester compound as formed from the combination of the alcohol component and the acid component is anisotropic, when observed with a polarizing microscope. A coating film comprising a polyester compound of this type is kept still tough, even after having been baked, due to the orientability or the like properties peculiar to liquid crystal compounds. As a result, therefore, it is believed that the film comprising the polyester compound shall have high hardness and high workability.

Where the above-mentioned PEG or PTG is used as the alcohol component, this reacts with the acid component to give a polyester compound with ether bonds. Desirably, the polyester compound with ether bonds has a reduced viscosity of 0.20 dl/g or less. If it has a reduced viscosity of more than 0.20 dl/g, its solubility in solvents and its compatibility with polyols and curing agents are greatly lowered with the result that the coatability of the composition comprising the compound will be poor. The reduced viscosity as referred to herein indicates a value to be obtained by dissolving a sample in a solution of phenol/tetrachloroethane (60/40 by weight) followed by measuring the viscosity of the resulting solution with an Ubelohode Viscometer at 25° C. Where the polyester compound with ether bonds is used in the composition of the invention and the composition is applied to a substrate, the crosslink structures to be in the resulting coating film can be made tough due to the combination of the flexible ether chain and the rigid naphthalene skeleton, and, as a result, it is believed that the film can have high hardness and high workability.

As the alcohol component, also employable are tri-valent or higher polyols in addition to the above-mentioned diols. Such polyols include, for example, triethylene glycol, glycerin, pentaerythritol, trimethylolpropane, and trimethylolethane.

The polyol of the above-mentioned ii) may include, for example, polyester polyols and acrylic polyols.

The polyester polyols are not specifically defined, provided that they have at least two hydroxyl groups in one molecule and have a number average molecular weight of from 1000 to 50000. Preferably, however, they have a number average molecular weight of from 1500 to 30000, more preferably from 2000 to 20000. The hydroxyl groups to be in the molecule of the polyester polyol may be either at the terminals of the molecule or in the side chains thereof. If a polyester polyol having a number average molecular weight of less than 1000 is used as the polyol of ii), the workability of the coating composition to be formed from the composition containing it is noticeably lowered. On the other hand, however, if a polyester polyol having a number average molecular weight of more than 50000 is used, the composition containing it is too viscous and therefore needs an excess solvent for diluting it. If so, the proportion of the resin to be in the coating composition shall be reduced, resulting in that the composition cannot form a suitable coating film. If so, moreover, the compatibility of the polyester polyol having such a high number average molecular weight with the other components to constitute the composition is greatly lowered. The number average molecular weight of the polyester polyol as referred to herein indicates the molecular weight thereof as measured, in terms of polystyrene, through gel permeation chromatography (hereinafter referred to as GPC).

The polyester polyol is a copolymer to be obtained by well-known thermal reaction of a poly-basic acid component with a polyol component. The poly-basic acid component includes, for example, phthalic anhydride, isophthalic acid, terephthalic acid, trimellitic anhydride, maleic acid, adipic acid, and fumaric acid. The polyol component includes, for example, ethylene glycol, diethylene glycol, polyethylene glycol, propylene glycol, dipropylene glycol, polypropylene glycol, 1,4-butanediol, 1,6-hexanediol, neopentyl glycol, triethylene glycol, glycerin, pentaerythritol, trimethylolpropane, and trimethylolethane. Commercially-available polyester polyols are employable, including, for example, "Almatex" (produced by Mitsui Toatsu Chemicals Co., Ltd.), "Alkinol" (produced by Sumitomo Bayer Urethane Co., Ltd.), "Desmophen" (produced by Sumitomo Bayer Urethane Co., Ltd.), and "Vylon" (produced by Toyobo Co., Ltd.).

The acrylic polyols are not also specifically defined, provided that they have at least two hydroxyl groups in one molecule and have a number average molecular weight of from 500 to 50000. Preferably, however, they have a number average molecular weight of from 1000 to 30000, more preferably from 1500 to 20000. The hydroxyl groups to be in the molecule of the acrylic polyol may be at random in the main chain of the acrylic polyol molecule. If an acrylic polyol having a number average molecular weight of less than 500 is used as the polyol of ii), the workability of the coating composition to be formed from the composition containing it is noticeably lowered. On the other hand, however, if an acrylic polyol having a number average molecular weight of more than 50000 is used, the composition containing it is too viscous and therefore needs an excess solvent for diluting it. If so, the proportion of the resin to be in the coating composition shall be reduced, resulting in that the composition cannot form a suitable coating film. If so, moreover, the compatibility of the acrylic polyol having such a high number average molecular weight with the other components to constitute the composition is greatly lowered. The number average molecular weight of the acrylic polyol as referred to herein indicates the molecular weight thereof as measured through GPC in terms of polystyrene.

The acrylic polyol is a copolymer to be obtained by well-known thermal reaction of an acrylic monomer having a hydroxyl group with an acrylate. The acrylic monomer having a hydroxyl group includes, for example, 2-hydroxyethyl methacrylate, 2-hydroxyethyl acrylate, and hydroxypropyl methacrylate, and hydroxypropyl acrylate. The acrylate includes, for example, methyl acrylate, ethyl acrylate, isopropyl acrylate, n-butyl acrylate, and 2-ethylhexyl acrylate. Commercially-available acrylic polyols are also employable, including, for example, "Almatex" (produced by Mitsui Toatsu Chemicals Co., Ltd.), and "Desmophen" (produced by Sumitomo Bayer Urethane Co., Ltd.).

The polyester compound of the above-mentioned i) and the polyol of the above-mentioned ii) react with the curing agent of the above-mentioned iii) to form a cured film. The curing agent of the above-mentioned iii) may comprise, for example, an isocyanate compound and/or an amino resin.

Any and every isocyanate compound to be prepared by ordinary methods can be used herein. Above all, however, preferred are isocyanate compounds as blocked with a blocking agent that can be selected from, for example, phenols, cresols, aromatic secondary amines, tertiary alcohols, lactams and oximes, since these can be in one-liquid-type coating compositions. The coating composition of the invention, if comprising such a blocked isocyanate compound, can be stored as a one-liquid-type composition and therefore can be easily applied to steel sheets to prepare precoated steel sheets. More preferred are non-yellowing isocyanate compounds, such as hexamethylene diisocyanate (hereinafter referred to as HDI) and its derivatives, tolylene diisocyanate (hereinafter referred to as TDI) and its derivatives, 4,4'-diphenylmethane diisocyanate (hereinafter referred to as MDI) and its derivatives, xylylene diisocyanate (hereinafter referred to as XDI) and its derivatives, isophorone diisocyanate (hereinafter referred to as IPDI) and its derivatives, trimethylhexamethylene diisocyanate (hereinafter referred t as TMDI) and its derivatives, hydrogenated TDI and its derivatives, hydrogenated MDI and its derivatives, hydrogenated XDI and its derivatives.

In addition, also employable are commercially-available isocyanate compounds which include, for example, "Sumidur" (produced by Sumitomo Bayer Urethane Co., Ltd.), and "Coronate" (produced by Nippon Polyurethane Industry Co., Ltd.).

Where such an isocyanate compound is used as the curing agent in the composition of the invention, the proportion of the isocyanato groups of the isocyanate compound to the hydroxyl groups of the polyester compound of the above-mentioned i) and the polyol of the above-mentioned ii) [NCO/OH] is preferably from 0.8 to 1.2, more preferably from 0.90 to 1.10, by mol. If the molar ratio, [NCO/OH], is less than 0.8, the coating film will be cured insufficiently and therefore cannot have the intended hardness and strength. On the other hand, if the molar ratio, [NCO/OH], is more than 1.2, unfavorable side reaction of excess isocyanato groups or of isocyanato groups with urethane bonds will occur, resulting in the lowering of the workability of the coating film formed.

The curing agent may comprise an amino resin, which may be a resin to be obtained by the reaction of urea, benzoguanamine or melamine with formaldehyde or a modified resin to be obtained by the alkyl-etherification of the resin with an alcohol such as methanol or butanol. Concretely, the modified amino resin includes, for example, methylated urea resins, n-butylated benzoguanamine resins, methylated melamine resins, n-butylated melamine resins, and iso-butylated melamine resins.

Commercially-available amino resins are also employable, including, for example, "Cymel" (Produced by Mitsui Cyanamid Co., Ltd.), "Uvan" (produced by Mitsui Toatsu Chemicals Co., Ltd.), "Sumimal" (produced by Sumitomo Chemical Co., Ltd.), and "Melan" (produced by Hitachi Chemical Co., Ltd.).

The proportion of the amino resin to the polyester compound of the above-mentioned i) and the polyol of the above-mentioned ii), in terms of the ratio by weight of the solid contents of these, is preferably such that the ratio, ([polyester compound]+[polyol])/[amino resin] is from 95/5 to 65/35, more preferably from 90/10 to 75/25.

Next, the second coating composition for precoated steel sheets of the present invention is referred to, which consists essentially of:

i) from 1 to 50% by weight of a polyester compound comprising main repeating units of a general formula:

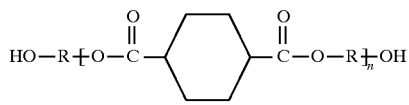

wherein n represents an integer of 10 or less; and R represents an alkylene group having 10 or less carbon atoms, or a 1,4-cyclohexylene-dimethylene group, or a neopentylene group;

ii) a polyol; and iii) a curing agent.

The polyester compound of the above-mentioned i) can be obtained by reacting an acid component, 1,4-cyclohexane-dicarboxylic acid and/or its lower alkyl ester, with an alcohol component.

The amount of this polyester compound to be in the coating composition shall be from 1 to 50% by weight, preferably from 2 to 40% by weight, more preferably from 3 to 30% by weight, relative to the solid content of the composition. If the polyester content is less than 1% by weight, the properties of the coating film to be formed from the composition are not good and are superior little to those of conventional coating films. If it is more than 50% by weight, the properties of the coating film to be formed from the composition, especially the flexibility thereof, are poor.

The acid component to be used to give the polyester compound of the above-mentioned i) consists essentially of 1,4-cyclohexane-dicarboxylic acid and/or its lower alkyl ester, but a part of this can be substituted with any of carboxylic acids such as terephthalic acid, isophthalic acid, naphthalene-2,6-dicarboxylic acid, naphthalene-2,7-dicarboxylic acid and diphenyldicarboxylic acid, and lower alkyl esters of such dicarboxylic acids. The lower alkyl ester includes, for example, methyl esters and ethyl esters having 1 or 2 carbon atoms. However, it is still desirable that the essential constituent, 1,4-cyclohexane-dicarboxylic acid accounts for 85 mol % or more of the whole acid component, while the proportion of the other substitutable compounds is less than 15 mol %.

Next, the alcohol component consists essentially of a diol. The diol may be any of aliphatic diols and alicyclic diols, including, for example, ethylene glycol, propylene glycol, 1,4-butanediol, 1,6-hexanediol, neopentyl glycol, and 1,4-cyclohexane-dimethanol.

The alcohol component is reacted with the acid component to give the polyester compound of the above-mentioned i). The polyester compound of the above-mentioned i) for use in the present invention can be obtained through ordinary polyester production, such as interesterification or direct esterification. In general, the acid component reacts with the alcohol component in a molar ratio of 1:2. Therefore, in order to effect the reaction efficiently, it is desirable to combine the acid component and the alcohol component in a ratio as near as possible to such a molar ratio of 1:2.

Desirably, the polyester compound of the above-mentioned i) has a number average molecular weight of 2000 or less, more preferably 1000 or less, as measured through GPC in terms of styrene. If a polyester compound having a number average molecular weight, in terms of styrene, of more than 2000 is used in the composition of the invention, the polyester compound is ineffective, resulting in that the outward appearance, the hardness and the workability of the coating film to be formed from the composition are poor.

As the alcohol component to be used to give the polyester compound of the above-mentioned i), also employable are tri-valent or higher polyols in addition to the above-mentioned diols. Such polyols include, for example, triethylene glycol, glycerin, pentaerythritol, trimethylolpropane, and trimethylolethane.

As the polyol of the above-mentioned ii) and the curing agent of the above-mentioned iii), employable are those that have been referred to hereinabove for the first coating composition of the present invention.

Where an izocyanate compound such as that mentioned hereinabove is used as the curing agent in the second coating composition of the invention, the proportion of the isocyanato groups of the isocyanate compound to the hydroxyl groups of the polyester compound of the above-mentioned i) and the polyol of the above-mentioned ii) [NCO/OH] is preferably from 0.75 to 1.25, more preferably from 0.85 to 1.15, by mol. If the molar ratio, [NCO/OH], is less than 0.75, the coating film will be cured insufficiently and therefore cannot have the intended hardness and strength. On the other hand, if the molar ratio, [NCO/OH], is more than 1.25, unfavorable side reaction of excess isocyanato groups or of isocyanato groups with urethane bonds will occur, resulting in the lowering of the workability of the coating film formed.

Next, the third coating composition for precoated steel sheets of the present invention is referred to, which consists essentially of:

i) from 1 to 15% by weight of a compound having the structure of a general formula:

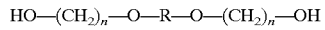

wherein n represents an integer of from 2 to 10; and R represents

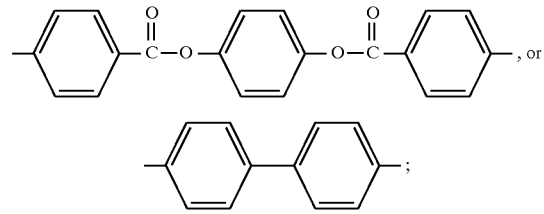

ii) a polyol; and iii) a curing agent.

The compound of the above-mentioned i) is a bifunctional compound comprising a rigid dibenzoyloxy-p-phenylene or biphenyl skeleton with hydroxyl groups at their both terminals via an oxygen and a methylene chain. In this, n (the number of methylene groups) is desirably from 2 to 10.

Compounds of the above-mentioned formula where n is 0 or 1 are difficult to produce, while those where n is more than 10 are unfavorable since the properties of the coating films comprising them are poor.

The amount of this compound to be in the coating composition shall be from 1 to 15% by weight, preferably from 2 to 12% by weight, more preferably from 3 to 10% by weight, relative to the solid content of the composition. If the content of this compound is less than 1% by weight, the properties of the coating film to be formed from the composition are not good and are superior little to those of conventional coating films. If it is more than 15% by weight, the properties of the coating film to be formed from the composition, especially the flexibility thereof, are poor.

The compound of the above-mentioned i) is anisotropic, when observed with a polarizing microscope. A coating film comprising a compound of this type is kept still tough, even after having been baked, due to the orientability or the like properties peculiar to liquid crystal compounds. As a result, therefore, it is believed that the film comprising the compound shall have high hardness and high workability.

Bis-hydroxyalkyl terephthalates having the following structural formula are known, of which the skeleton is similar to that of the compounds of the above-mentioned i) to be used in the present invention.

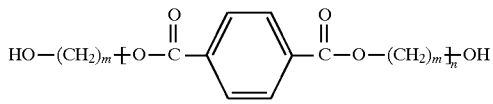

wherein m is generally an integer of from 2 to 6; and n is an integer.

However, the properties of the coating film to be formed from a coating composition comprising this compound are inferior to those of the coating film to be formed from the coating composition of the present invention, as so demonstrated as the comparative samples in the examples to be mentioned hereinunder, and, therefore, the coating film comprising this compound is unsuitable to precoated steel sheets.

As the polyol of the above-mentioned ii) and the curing agent of the above-mentioned iii), employable are those that have been referred to hereinabove for the first coating composition of the present invention.

Where an isocyanate compound such as that mentioned hereinabove is used as the curing agent in the third coating composition of the invention, the proportion of the isocyanato groups of the isocyanate compound to the hydroxyl groups of the polyester compound of the above-mentioned i) and the polyol of the above-mentioned ii) [NCO/OH] is preferably from 0.75 to 1.25, more preferably from 0.85 to 1.15, by mol. If the molar ratio, [NCO/OH], is less than 0.75, the coating film will be cured insufficiently and therefore cannot have the intended hardness and strength. On the other hand, if the molar ratio, [NCO/OH], is more than 1.25, unfavorable side reaction of excess isocyanato groups or of isocyanato groups with urethane bonds will occur, resulting in the lowering of the workability of the coating film formed.

The constitutions of the first to third coating compositions of the present invention are mentioned above. In practical use of these compositions, they are dissolved in organic solvents. The organic solvent to be used includes, for example, methyl ethyl ketone, methyl isobutyl ketone, cyclohexanone, Solvesso 100, Solvesso 200, toluene, xylene methyl cellosolve, butyl cellosolve, cellosolve acetate, butyl cellosolve acetate, carbitol, ethyl carbitol acetate, butyl carbitol acetate, ethyl acetate, butyl acetate, petroleum ether, and petroleum naphtha.

Depending on its object and use, the coating composition of the present invention may optionally contain a curing promoter such as p-toluenesulfonic acid, tin octoate, dibutyl tin dilaurate, lead 2-ethylhexoate, etc.; a pigment such as calcium carbonate, kaolin, clay, titanium oxide, talc, barium sulfate, mica, red iron oxide, manganese blue, carbon black, etc.; and other various additives such as a defoaming agent, an antirunning agent, etc.

To prepare the coating composition of the invention, the constitutive components may be mixed while selectively using ordinary dispersing machines and kneaders, such as sand grinding mills, ball mills, blenders, etc.

The steel sheets to which the coating composition of the present invention is applied are not specifically defined. In general, however, the composition may be applied onto chemically-processed steel sheets to be prepared by chemically processing the surfaces of cold-rolled steel sheets, hot-dip zinc-plated steel sheets, electrolytic zinc-plated steel sheets, composite zinc-plated steel sheets, chromium-plated steel sheets (TFS), etc., through phosphate treatment or chromate treatment. Where the composition is applied onto the surfaces of such chemically-processed steel sheets, the adhesiveness of the coating film to the steel sheets is improved and the corrosion resistance of the film is also improved. In order to further improve the adhesiveness of the coating film of the composition of the invention to the steel sheets and the corrosion resistance of the film, a primer coat containing a rust-inhibiting pigment can formed on the steel sheets as the under coat. For this, suitably used are epoxy-type or polyester-type primer coats.

The method of coating the coating composition of the present invention is not specifically defined. However, preferably employed are a coating method using a roll coater, and a curtain flow coating system. After having been coated, the film is baked by various heating means of, for example, hot air heating, infrared heating or induction heating, to thereby crosslink the resin to give a cured film. The baking treatment for thermally curing the film is suitably conducted at from 200° to 250° C. for about from 40 seconds to 3 minutes or so. The thickness of the cured film thus formed may be generally from 15 to 25 μm or so, which, however, is not specifically limitative.

Desirably, the coating composition of the present invention is used as the top coat for a two-coat and two-bake system or a three-coat and three-bake system, which, however, is not always limitative. Where the composition is used in a three-coat and three-bake system, it is desirable to provide an intermediate coat that can be subjected to an ordinary three-coat and three-bake system, between the coat of the composition of the invention and the primer coat.

EXAMPLES

Next, examples of the present invention are given below.
[Preparation of Compounds]

Compounds (I-1) to (I-10), compounds (II-1) to (II-4), compounds (III-1) to (III-3) and polyols (1) and (2) used in the following examples were prepared according to the methods mentioned below.

Compound (I-1): Polyester Compound 1.0 mol of naphthalene-2,6-dicarboxylic acid dimethyl ether (hereinafter referred to as 2,6-NDCM) and 2.1 mols of ethylene glycol were put into a reactor equipped with a heater, stirrer, a rectification column and a thermometer, and melted therein under heat at 200° C. Next, a catalyst, manganese acetate was added thereto in an amount of 0.03 mol % relative to 2,6-NDCM. This was gradually heated up to 230° C., and 0.03 mol %, relative to 2,6-NDCM, of trimethyl phosphate was added thereto after a theoretical amount, 64 g (2.0 mols) of methanol was distilled out. Then, the reaction was terminated. Thus was obtained compound (I-1). This had a reduced viscosity of 0.05 dl/g. As a result of the observation with a polarizing microscope, the compound exhibited anisotropy at temperatures ranging between 130° and 190° C. or so during heating and at temperatures ranging between 140° C. and room temperature during cooling. To determine the temperature ranges, a thin sample of the compound was sandwiched between two sheets of slide glass, and set on a polarizing microscope having a temperature-controlling function, and the sample was observed in polarized light while heating or cooling. The temperature range within which the field of view of the sample was kept light was referred to as the anisotropy-exhibiting temperature range of the compound.

Compound (I-2): Polyester Compound 0.5 mols of 2,6-NDCM and 1.02 mols of 1,4-butanediol were put into a reactor equipped with a heater, stirrer, a rectification column and a thermometer, and melted therein under heat at 200° C. Next, a catalyst, titanium tetra-n-butoxide was added thereto in an amount of 0.06 mol % relative to 2,6-NDCM. This was gradually heated up to 240° C., and the reaction was terminated after a theoretical amount, 32 g (1.0 mol) of methanol was distilled out. Thus was obtained compound (I-2). This had a reduced viscosity of 0.04 dl/g. As a result of the observation with a polarizing microscope in the same manner as above, the compound exhibited anisotropy at temperatures ranging between 90° and 180° C. or so during heating and at temperatures ranging between 160° C. and room temperature during cooling.

Compound (I-3): Polyester Compound 0.5 mols of 2,6-NDCM and 1.02 mols of 1,4-cyclohexane-dimethanol (of which the trans-form content was 70% by weight) were put into a reactor equipped with a heater, stirrer, a rectification column and a thermometer, and melted therein under heat at 200° C. Next, a catalyst, titanium tetra-n-butoxide was added thereto in an amount of 0.06 mol % relative to 2,6-NDCM. This was gradually heated up to 270° C., and the reaction was terminated after a theoretical amount, 32 g (1.0 mol) of methanol was distilled out. Thus was obtained compound (I-3). This had a reduced viscosity of 0.05 dl/g. As a result of the observation with a polarizing microscope in the same manner as above, the compound exhibited anisotropy at temperatures ranging between 140° and 280° C. or so during heating and at temperatures ranging between 240° C. and room temperature during cooling.

Compound (I-4): Polyester Compound 0.5 mols of 2,6-NDCM and 1.05 mols of neopentyl glycol were put into a reactor equipped with a heater, stirrer, a rectification column and a thermometer, and melted therein under heat at 200° C. Next, a catalyst, calcium acetate was added thereto in an amount of 0.03 mol % relative to 2,6-NDCM. This was gradually heated up to 240° C., and 0.03 mol %, relative to 2,6-NDCM, of trimethyl phosphate was added thereto after a theoretical amount, 32 g (1.0 mol) of methanol was distilled out. Then, the reaction was terminated. Thus was obtained compound (I-4). This had a reduced viscosity of 0.04 dl/g. As a result of the observation with a polarizing microscope in the same manner as above, the compound exhibited anisotropy at temperatures ranging between 100° and 180° C. or so during heating and at temperatures ranging between 190° C. and room temperature during cooling.

Compound (I-5): Polyester Compound (comparative sample)

1.0 mol of dimethyl terephthalate (hereinafter referred to as DMT) and 2.1 mols of ethylene glycol were put into a reactor equipped with a heater, stirrer, a rectification column and a thermometer, and melted therein under heat at 180° C. Next, a catalyst, manganese acetate was added thereto in an amount of 0.03 mol % relative to DMT. This was gradually heated up to 220° C., and 0.03 mol %, relative to DMT, of trimethyl phosphate was added thereto after a theoretical amount, 64 g (2.0 mols) of methanol was distilled out. Then, the reaction was terminated. Thus was obtained compound (I-5). This had a reduced viscosity of 0.04 dl/g. As a result of the observation with a polarizing microscope in the same manner as above, the compound exhibited anisotropy at temperatures ranging between 80° and 120° C. or so during heating but not during cooling.

Compound (I-6): Polyester Compound with Ether Bonds 0.5 mols of 2,6-NDCM and 1.05 mols of diethylene glycol were put into a reactor equipped with a heater, stirrer, a rectification column and a thermometer, and melted therein under heat at 200° C. Next, a catalyst, titanium tetra-n-butoxide was added thereto in an amount of 0.10 mol % relative to 2,6-NDCM. This was gradually heated up to 240° C., and the reaction was terminated after a theoretical amount, 32 g (1.0 mol) of methanol was distilled out. Thus was obtained compound (I-6). This had a reduced viscosity of 0.05 dl/g Compound (I-7): Polyester Compound with Ether Bonds 0.5 mols of 2,6-NDCM and 1.02 mols of polyethylene glycol having a mean molecular weight of 200 (PEG #200) were put into a reactor equipped with a heater, stirrer, a rectification column and a thermometer, and melted therein under heat at 200° C. Next, a catalyst, titanium tetra-n-butoxide was added thereto in an amount of 0.06 mol % relative to 2,6-NDCM. This was gradually heated up to 270° C., whereupon 95% by weight of a theoretical amount, 30 g of methanol was distilled out over a period of 3 hours from the addition of the catalyst. Thus was obtained compound (I-7). This had a reduced viscosity of 0.08 dl/g Compound (I-8): Polyester Compound with Ether Bonds 0.5 mols of 2,6-NDCM and 1.02 mols of polyethylene glycol having a mean molecular weight of 600 (PEG #600) were put into a reactor equipped with a heater, stirrer, a rectification column and a thermometer, and melted therein under heat at 200° C. Next, a catalyst, titanium tetra-n-butoxide was added thereto in an amount of 0.06 mol % relative to 2,6-NDCM. This was gradually heated up to 270° C., whereupon 92% by weight of a theoretical amount, 29 g of methanol was distilled out over a period of 4 hours and 10 minutes from the addition of the catalyst. Thus was obtained compound (I-8). This had a reduced viscosity of 0.07 dl/g Compound (I-9): Polyester Compound with Ether Bonds 0.5 mols of 2,6-NDCM and 1.02 mols of polytetraethylene glycol having a mean molecular weight of 650 (PTG #650) were put into a reactor equipped with a heater, stirrer, a rectification column and a thermometer, and melted therein under heat at 200° C. Next, a catalyst, titanium tetra-n-butoxide was added thereto in an amount of 0.06 mol % relative to 2,6-NDCM. This was gradually heated up to 270° C., whereupon 93% by weight of a theoretical amount, 30 g of methanol was distilled out over a period of 4 hours from the addition of the catalyst. Thus was obtained compound (I-9). This had a reduced viscosity of 0.07 dl/g Compound (I-10): Polyester Compound with Ether Bonds (comparative sample)

0.5 mols of DMT and 1.02 mols of polytetraethylene glycol having a mean molecular weight of 650 (PTG #650) were put into a reactor equipped with a heater, stirrer, a rectification column and a thermometer, and melted therein under heat at 170° C. Next, a catalyst, titanium tetra-n-butoxide was added thereto in an amount of 0.06 mol % relative to DMT. This was gradually heated up to 240° C., whereupon 92% by weight of a theoretical amount, 29 g of methanol was distilled out over a period of 4 hours and 20 minutes from the addition of the catalyst. Thus was obtained compound (I-10). This had a reduced viscosity of 0.07 dl/g Compound (II-1): Polyester Compound 200 parts by weight of dimethyl 1,4-cyclohexane-dicarboxylate (of which the trans-isomer content was 20%; produced by Towa Chemical Industry Co., Ltd.), 130 parts by weight of ethylene glycol, and 0.84 parts by weight of titanium tetra-n-butoxide were put into a reactor equipped with a heater, stirrer, a rectification column and a thermometer, and gradually heated up to 240° C., whereupon 64 parts by weight of methanol was distilled out over a period of about 5 hours. Then, the reaction was terminated. Thus was obtained compound (II-1). This was a white waxy solid at room temperature (23° C.), and its number average molecular weight (Mn) as measured through GPC was 512.

Compound (II-2): Polyester Compound 200 parts by weight of dimethyl 1,4-cyclohexane-dicarboxylate (of which the trans-isomer content was 99%; produced by Towa Chemical Industry Co., Ltd.), 130 parts by weight of ethylene glycol, and 0.53 parts by weight of titanium tetra-n-butoxide were put into a reactor equipped with a heater, stirrer, a rectification column and a thermometer, and gradually heated up to 200° C., whereupon 64 parts by weight of methanol was distilled out over a period of about 5 hours. Then, the reaction was terminated. Thus was obtained compound (II-2). This was a white crystalline solid at room temperature (23° C.), and its number average molecular weight (Mn) as measured through GPC was 326.

Compound (II-3): Polyester Compound 200 parts by weight of dimethyl 1,4-cyclohexane-dicarboxylate (of which the trans-isomer content was 20%; produced by Towa Chemical Industry Co., Ltd.), 248 parts by weight of 1,6-hexanediol, and 0.53 parts by weight of titanium tetra-n-butoxide were put into a reactor equipped with a heater, stirrer, a rectification column and a thermometer, and gradually heated up to 240° C., whereupon 64 parts by weight of methanol was distilled out over a period of about 5 hours. Then, the reaction was terminated. Thus was obtained compound (II-3). This was a white waxy solid at room temperature (23° C.), and its number average molecular weight (Mn) as measured through GPC was 618.

Compound (II-4): Polyester Compound (comparative sample)

194 parts by weight of dimethyl terephthalate (hereinafter referred to as DMT), and 130 parts by weight of ethylene glycol were put into a reactor equipped with a heater, stirrer, a rectification column and a thermometer, and melted under heat at 180° C. Next, 0.074 parts by weight of a catalyst, manganese acetate was added thereto, and then gradually heated up to 220° C. 0.042 parts by weight of trimethyl phosphate was added thereto, after 64 parts by weight of methanol was distilled out, and the reaction was thus terminated. Thus was obtained compound (II-4). This was a white solid at room temperature (23° C.), and had a reduced viscosity of 0.04 dl/g. The reduced viscosity was obtained by dissolving a sample of the compound in a solution of phenol/tetrachloroethane (60/40, by weight), followed by measuring the viscosity of the resulting solution with an Ubelohode Viscometer at 25° C.

Compound (III-1)

8.9 parts by weight of sodium hydride, 27.2 parts by weight of 6-chloro-1-hexanol and 32.8 parts by weight of benzyl bromide were dropwise added to 200 ml of dry THF, while stirring them. A large excess amount of water was added to the reaction mixture, which was then extracted with methylene chloride. The resulting extract was washed with water, dried with anhydrous magnesium sulfate, and evaporated using an evaporator. The resulting residue was distilled under reduced pressure to obtain compound (1-a) (colorless liquid). Next, 27.6 parts by weight of p-hydroxybenzoic acid, 30 parts by weight of sodium hydroxide and 0.5 parts by weight of potassium iodide were put into a reactor equipped with an oil bath, a stirrer, a reflux device and a thermometer, and these were dissolved in 100 ml of ethanol and 30 ml of water added thereto. 50 ml of an ethanolic solution comprising 25 parts by weight of the above-mentioned compound (1-a) was dropwise added to the solution in the reactor, and then heated under reflux. After the reaction, this was evaporated, using an evaporator, to remove ethanol. Water was added to the resulting residue, which was then extracted with methylene chloride. The resulting extract was dried with anhydrous magnesium sulfate and evaporated to obtain compound (1-b) (white crystals). 26.3 parts by weight of compound (1-b) and 0.1 ml of pyridine were dissolved in 75 ml of thionyl chloride, and then heated under reflux. After the reaction, methylene chloride was removed from the reaction system by distillation under reduced pressure, and compound (1-c) was thus obtained. 8.67 parts by weight of compound (1-c) was dissolved in chloroform, and the resulting solution was dropwise added to a dry pyridine solution comprising 1.65 parts by weight of hydroquinone, and reacted in a nitrogen atmosphere for 60 hours. Next, water was added to the reaction mixture, which was then extracted with chloroform. The resulting extract was washed with an alkaline solution and water in that order, then dried with anhydrous magnesium sulfate, and evaporated to obtain a jelly-like compound, (1-d). 12.5 parts by weight of compound (1-d), 1.9 parts by weight of 10% palladium/charcoal and 150 ml of ethanol were put into an egg-plant type flask, which was connected with a reflux condenser equipped with a three-way stop-cock, and the reaction system was substituted with a hydrogen gas atmosphere. Thus, these were reacted for 24 hours at room temperature and under normal pressure. After the reaction, the filtrate was removed using an evaporator, and a white crystalline compound, (III-1) was obtained.

This compound (III-1) had a molecular weight of 550.65, as identified through field deionization mass spectrography (hereinafter referred to FD-MS). As a result of the observation of the compound with a polarizing microscope equipped with a hot stage, the compound exhibited anisotropy at temperatures falling between 144° and 210° C.

Compound (III-2)

55.8 parts by weight of dihydroxy-biphenyl, 180 parts by weight of an aqueous solution of 50% sodium hydroxide, 150 parts by weight of ethanol, and a minor amount of potassium iodide were put into a reactor, and heated at 60° C. To this was added 90.1 parts by weight of 6-chloro-1-hexanol, and reacted at 75° C. for 20 hours, and thereafter the solvent was removed using an evaporator. The resulting residue was washed with water, and recrystallized from 2-propanol to obtain compound (III-2).

This compound (III-2) was identified to have a molecular weight of 386.53 through FD-MS. As a result of the observation of the compound with a polarizing microscope equipped with a hot stage, the compound exhibited anisotropy at temperatures falling between 171° and 182° C.

Compound (III-3) (comparative sample)

194 parts by weight of dimethyl terephthalate (hereinafter referred to as DMT), and 130 parts by weight of ethylene glycol were put into a reactor equipped with a heater, stirrer, a rectification column and a thermometer, and melted under heat at 180° C. Next, 0.074 parts by weight of a catalyst, manganese acetate was added thereto, and then gradually heated up to 220° C. 0.042 parts by weight of trimethyl phosphate was added thereto, after a theoretical amount, 64 parts by weight of methanol was distilled out, and the reaction was thus terminated. Thus was obtained compound (III-3). This was a white solid at room temperature (23° C.), and had a reduced viscosity of 0.04 dl/g. The reduced viscosity was obtained by dissolving a sample of the compound in a solution of phenol/tetrachloroethane (60/40, by weight), followed by measuring the viscosity of the resulting solution with an Ubelohode Viscometer at 25° C.

Polyester Polyol (1)

174.6 parts by weight of DMT, 213.4 parts by weight of dimethyl isophthalate, 93.0 parts by weight of ethylene glycol, 52.0 parts by weight of neopentyl glycol, and 1.5 parts by weight of manganese acetate catalyst were put into a reactor equipped with a heater, stirrer, a rectification column, a pressure-reducing device and a thermometer, and interesterified in a nitrogen atmosphere at from 180° to 210° C., whereupon methanol was removed by distillation. Next, 6.1 parts by weight of trimethylol-propane was added thereto, and polymerized while heating up to 250° C. and gradually reducing the pressure to 10 mmHg. The product was adjusted to have a non-volatile content of 70% by weight, by adding a cyclohexanone solution thereto. Thus was obtained polyester polyol (1). Its number average molecular weight (Mn) as obtained through GPC was 3000, and its hydroxyl value as obtained according to a phthalic anhydride-pyridine process was 60.0 mg KOH/g.

Polyester Polyol (2)

Polyester polyol (2) was obtained in the same manner as in the above-mentioned production of polyester polyol (1), except that the polymerization time was varied. This polyester polyol (2) had a non-volatile content of 60% by weight, its number average molecular weight (Mn) as obtained through GPC was 4000, and its hydroxyl value as obtained according to a phthalic anhydride-pyridine process was 45.0 mg KOH/g.

The chemical structural formulae of the above-mentioned compounds (I-1) to (I-10), compounds (II-1) to (II-4) and compounds (III-1) to (III-3) are shown below.

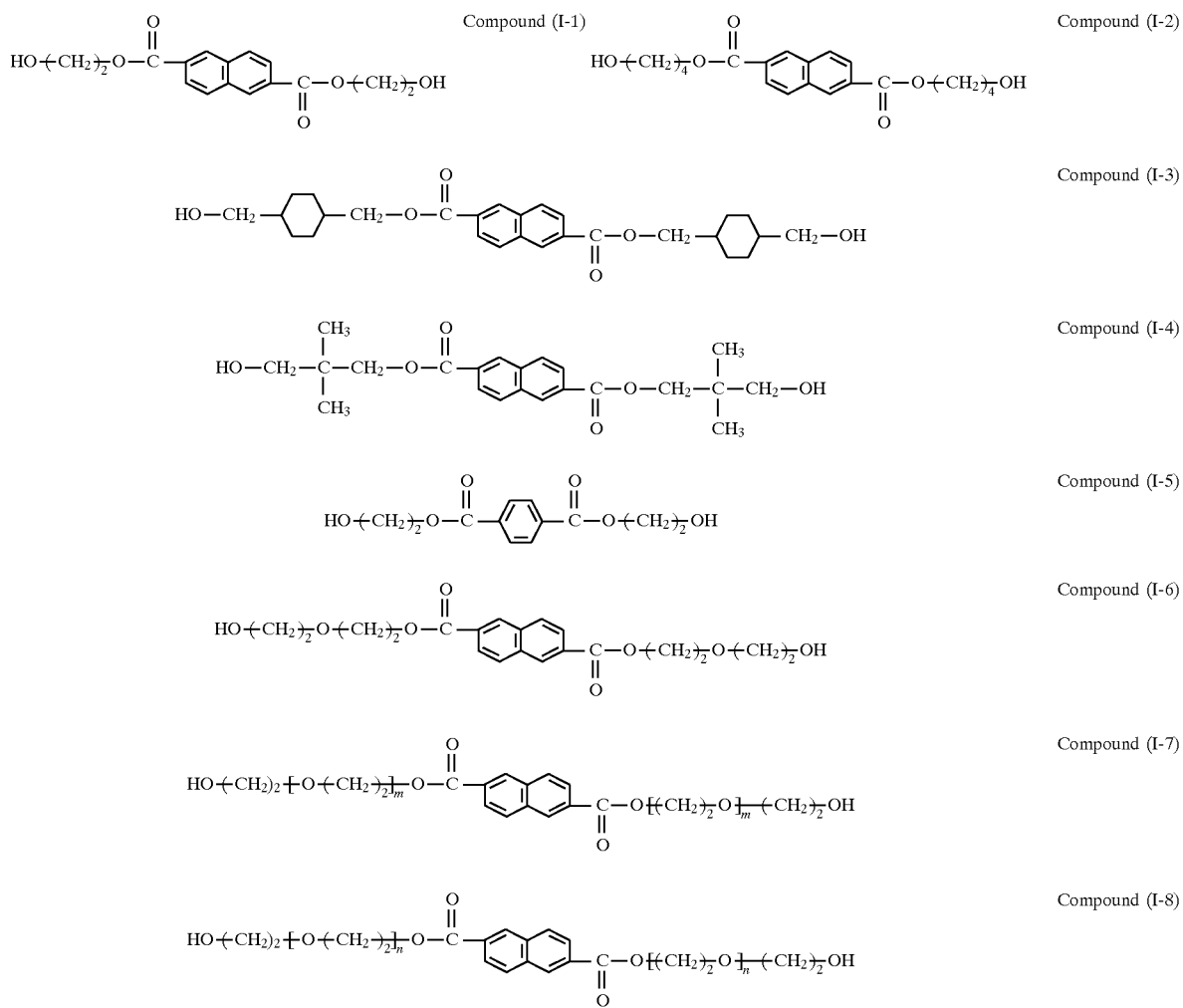

-continued

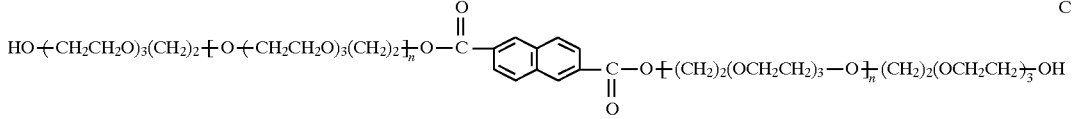

Compound (I-9)

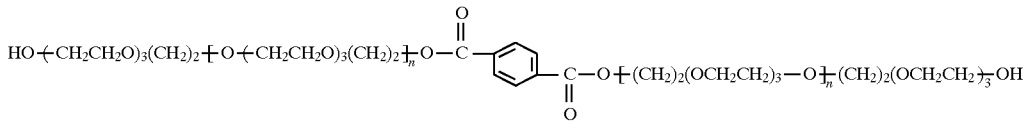

Compound (I-10)

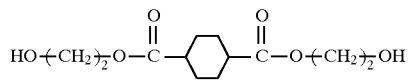

Compound (II-1)

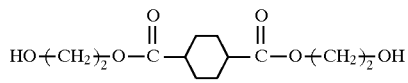

Compound (II-2)

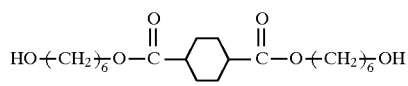

Compound (II-3)

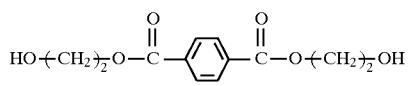

Compound (II-4)

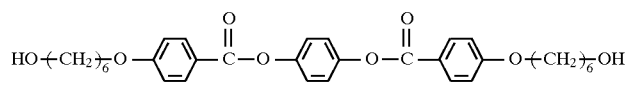

Compound (III-1)

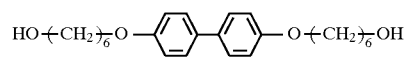

Compound (III-2)

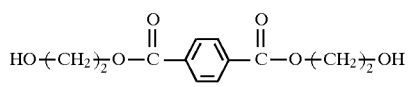

Compound (III-3)

[Test Methods]

The conditions for testing the characteristics of the samples and the methods for evaluating the samples as employed in the following examples are mentioned below.

(1) Surface Gloss

According to JIS K5400, the 60° C. mirror reflectivity (%) of each sample was measured.

(2) Pencil Hardness

Using pencils "Uni" (produced by Mitsubishi Pencils Co., Ltd.), the pencil hardness of each sample was measured according to JIS K5400.

(3) Flexibility

A precoated steel sheet sample was bent, using a bending vice as stipulated in Item 6.15 (bending resistance) of JIS K5400. A plurality of the same samples were inserted inside the thus-bent sample, which was further bent using a press. The bent portion of the sample was observed with a 30× magnifier. The minimum number of the samples as inserted inside the bent sample without making the film on the bent sample cracked was counted. The thus-counted minimum number with "T", such as 1T, 2T, 3T, is given in the following table to show the flexibility of the sample tested.

(4) Adhesiveness 100 cross-cuts of 10 mm×10 mm each were formed on the cured film of each sample at intervals of 1 mm, using a cutter knife, and an adhesive tape was attached to the thus-cut film and then forcedly peeled off, whereupon the condition of the cross-cuts of the film was observed and the number of cross-cuts peeled off along with the adhesive tape was counted. The adhesiveness of the film to the sample tested was evaluated in terms of 100—(the number of peeled cross-cuts).

(5) Impact Resistance

Using a DuPont impact tester, the impact resistance of each sample was determined in accordance with JIS K5400. Precisely, a ball weighing 1.0 kg or 1.5 kg was dropped down onto the film of each sample from a varying height of up to 50 cm, and the surface of the film was observed with a 30× magnifier. The largest height from which the ball was dropped down without making the surface of the tested film cracked was obtained and multiplied by the weight of the ball. The data thus obtained indicate the impact resistance of each sample.

(6) Solvent Resistance Test

The surface of the film of each sample was rubbed with gauge with methyl ethyl ketone under a load of 1.0 kg. One back-and-force rubbing operation is referred to as one cycle. The number of cycles applied to each sample without making the primer exposed out was counted. The largest number of cycles was limited to 100.

(7) Weather Resistance

Using a sunshine weather-O-meter, the surface gloss of each sample was measured, in terms of the mirror reflection at 60°, before and after exposure for 720 hours. The gloss retention percentage after the exposure was calculated from the data, which indicates the weather resistance of each sample.

(8) Acid Resistance (Chemical Resistance)

A polyethylene cylinder (inner diameter: about 25 mm) was closely attached onto each sample, and 2 ml of 0.1N sulfuric acid solution was dropped onto each sample, which was then left at room temperature for 24 hours, and washed with water. After one hour, the acid resistance of each sample was evaluated on the basis of the surface gloss retention percentage (%) of 60° mirror reflection. Samples having a surface gloss retention percentage of 85% or more were ranked as "5"; those of from 60% to less than 85% as "4"; those of from 40% to less than 60% as "3"; those of from 20% to less than 40% as "2"; and those of less than 20% as "1".

(9) Alkali Resistance (Chemical Resistance)

A polyethylene cylinder (inner diameter: about 25 mm) was closely attached onto each sample, and 2 ml of 0.1N sodium hydroxide solution was dropped onto each sample, which was then left at room temperature for 24 hours, and washed with water. After one hour, the alkali resistance of each sample was evaluated on the basis of the surface gloss retention percentage (%) of 60° mirror reflection. Samples having a surface gloss retention percentage of 85% or more were ranked as "5"; those of from 60% to less than 85% as "4"; those of from 40% to less than 60% as "3"; those of from 20% to less than 40% as "2"; and those of less than 20% as "1".

(10) Measurement of Glass Transition Point

A thermomechanometric tester TMA120 Model (produced by Seiko Instruments Inc.) was used. While heating each sample at a rate of 1° C./min, the film coated thereon was cured on a steel plate, whereupon the glass transition point of the film was measured.

[Example 1]

Using the above-mentioned compounds (I-1) to (I-10) and polyols (1) and (2), prepared were coating compositions, which were applied to steel sheets to produce precoated steel sheets, samples of the invention and comparative samples mentioned below. The properties of the films of these samples were examined. The results are shown in Tables 1 to 5, along with the formulations of the coating compositions.

Commercial products of "Desmophen A365", "Desmodur BL3175", "Desmodur XP7001", "Desmodur BL4165", and "Cymel 300", (all trade names) shown in Tables 1 to 14 are the following compounds.

Desmophen A365

Acrylic polyol, produced by Sumitomo Bayer Urethane Co., Ltd. (OH content: 2.8%, nonvolatile content: 65%)

Desmodur BL3175

HDI isocyanurate-type, blocked isocyanate, produced by Sumitomo Bayer Urethane Co., Ltd. (NCO content: 11.1%, nonvolatile content: 75%)

Desmodur XP7001

Hydrogenated MDI prepolymer, produced by Sumitomo Bayer Urethane Co., Ltd. (NCO content: 8.9 G, nonvolatile content: 75%)

Desmodur BL4165

IPDI isocyanurate-type, blocked isocyanate, produced by Sumitomo Bayer Urethane Co., Ltd. (NCO content: 8.1%, nonvolatile content: 65%)

Cymel 300

Methylated melamine, produced by Mitsui Cyanamid Co., Ltd. (nonvolatile content: 100%)

Sample 1 of the invention 40 parts by weight of cyclohexanone was added to 1.8 parts by weight of polyester compound (I-1), and stirred for 12 hours. Prior to the addition, compound (I-1) was ground with a grinder into a powder of 250μ or less. To the resulting dispersion of compound (I-1) in cyclohexanone, added were 94.0 parts by weight of polyester polyol (1), 43.0 parts by weight of blocked isocyanate (Desmodur BL3157), 80.0 parts by weight of rutile-type titanium oxide, 10.0 parts by weight of 10% solution of dibutyl tin dilaurate (hereinafter referred to as DBTDL) in cyclohexanone, and 4.4 parts by weight of 50% solution of Acronal 4F (produced by BASF Co., Ltd.) in cyclohexanone. These were dispersed, using a sand mill containing glass beads of about 1 mm diameter therein, for 1 hour. Next, cyclohexanone was added thereto to make it have a nonvolatile content of 60% by weight. Thus was prepared a coating composition. Using a bar coater, this was applied onto an electrolytic zinc-plated steel sheet (thickness: 0.5 mm) that had been processed by chromate treatment and undercoated with a polyester primer (film thickness: 4 μm), at a dry film thickness of from 15 to 18 μm, and then baked in a hot-air drying furnace at 210° C. for 150 seconds. Thus was obtained a precoated steel sheet.

Samples 2 to 4 of the invention

Using the same compound, polyol and curing agent as those for Sample 1 but varying the amount of compound (I-1) added, different coating compositions were prepared as shown in Table 1. The proportion of compound (I-1) in each resin composition was 5.0% by weight, 8.0% by weight and 12.0% by weight in Sample 2, Sample 3 and Sample 4, respectively. These coating compositions were separately applied onto different steel sheets and baked, in the same manner as for Sample 1, to obtain precoated steel sheets.

Sample 5 of the invention

A coating composition having the formulation shown in Table 1 was prepared in the same manner as in the preparation of the composition for Sample 1 of the invention mentioned above, except that a blocked isocyanate (Desmodur XP7001) was used as the curing agent. This was applied onto a steel sheet and baked in the same manner as for Sample 1 of the invention, to obtain a precoated steel sheet.

Sample 6 of the invention

A coating composition having the formulation shown in Table 1 was prepared in the same manner as in the preparation of the composition for Sample 1 of the invention mentioned above, except that a blocked isocyanate (Desmodur BL4165) was used as the curing agent. This was applied onto a steel sheet and baked in the same manner as for Sample 1 of the invention, to obtain a precoated steel sheet.

Sample 7 of the invention 125.0 parts by weight of polyester polyol (2), 20.0 parts by weight of methylated melamine (Cymel), 80.0 parts by weight of rutile-type titanium oxide, and 0.5 parts by weight of p-toluenesulfonic acid were added to the dispersion of compound (I-1) in cyclohexanone that had been prepared in the same manner as for Sample 1 of the invention mentioned above, and dispersed for 1 hour, using a sand mill containing therein glass beads having a diameter of about 1 mm. The resulting dispersion was made to have a non-volatile content of 60% by weight by adding cyclohexanone thereto, to obtain a coating composition. This was applied onto a steel sheet and baked in the same manner as for Sample 1 of the invention mentioned above, to obtain a precoated steel sheet.

Sample 8 of the invention 98.0 parts by weight of acrylic polyol (Desmophen A365), 48.4 parts by weight of blocked isocyanate (Desmodur BL3175), 80.0 parts by weight of rutile-type titanium oxide, 10 parts by weight of a 10% solution of DBTDL in cyclohexanone, and 4.4 parts by weight of a 50% solution of Acronal 4F in cyclohexanone were added to the dispersion of compound (I-1) in cyclohexanone that had been prepared in the same manner as for Sample 1 of the invention mentioned above, and dispersed for 1 hour, using a sand mill containing therein glass beads having a diameter of about 1 mm. The resulting dispersion was made to have a non-volatile content of 60% by weight by adding cyclohexanone thereto, to obtain a coating composition. This was applied onto a steel sheet and baked in the same manner as for Sample 1 of the invention mentioned above, to obtain a precoated steel sheet.

Sample 9 of the invention

Herein using compound (I-2) as the polyester compound, the formulation as in Table 2 was prepared and processed in the same manner as for Sample 2 of the invention mentioned above to obtain a coating composition. This was applied onto a steel sheet and baked in the same manner as for Sample 1 of the invention to obtain a precoated steel sheet.

Sample 10 of the invention

Herein using compound (I-3) as the polyester compound, the formulation as in Table 2 was prepared and processed in the same manner as for Sample 2 of the invention mentioned above to obtain a coating composition. This was applied onto a steel sheet and baked in the same manner as for Sample 1 of the invention to obtain a precoated steel sheet.
Sample 11 of the invention Herein using compound (I-4) as the polyester compound, the formulation as in Table 2 was prepared and processed in the same manner as for Sample 2 of the invention mentioned above to obtain a coating composition. This was applied onto a steel sheet and baked in the same manner as for Sample 1 of the invention to obtain a precoated steel sheet.
Sample 12 of the invention Herein using compound (I-6) as the polyester compound, the formulation as in Table 2 was prepared and processed in the same manner as for Sample 2 of the invention mentioned above to obtain a coating composition. This was applied onto a steel sheet and baked in the same manner as for Sample 1 of the invention to obtain a precoated steel sheet.
Sample 13 of the invention Herein using compound (I-7) as the polyester compound, the formulation as in Table 2 was prepared and processed in the same manner as for Sample 2 of the invention mentioned above to obtain a coating composition. This was applied onto a steel sheet and baked in the same manner as for Sample 1 of the invention to obtain a precoated steel sheet.
Sample 14 of the invention Herein using compound (I-8) as the polyester compound, the formulation as in Table 2 was prepared and processed in the same manner as for Sample 2 of the invention mentioned above to obtain a coating composition. This was applied onto a steel sheet and baked in the same manner as for Sample 1 of the invention to obtain a precoated steel sheet.
Sample 15 of the invention Herein using compound (I-9) as the polyester compound, the formulation as in Table 2 was prepared and processed in the same manner as for Sample 2 of the invention mentioned above to obtain a coating composition. This was applied onto a steel sheet and baked in the same manner as for Sample 1 of the invention to obtain a precoated steel sheet.
Comparative Sample 1

99.7 parts by weight of polyester polyol (1),.40.3 parts by weight of blocked isocyanate (Desmodur BL3175), 80.0 parts by weight of rutile-type titanium oxide, 10.0 parts by weight of a 10% solution of DBTDL in cyclohexanone, and 4.4 parts by weight of a 50% solution of Acronal 4F in cyclohexanone were mixed and dispersed for 1 hour, using a sand mill containing therein glass beads having a diameter of about 1 mm. The resulting dispersion was made to have a non-volatile content of 60% by weight by adding cyclohexanone thereto to obtain a coating composition. Using a bar coater, this was applied onto an electrolytic zinc-plated steel sheet (thickness: 0.5 mm) that had been processed by chromate treatment and undercoated with a polyester primer (film thickness: 4 μm), at a dry film thickness of from 15 to 18 μm, and then baked in a hot-air drying furnace at 210° C. for 150 seconds. Thus was obtained a precoated steel sheet.
Comparative Samples 2 and 3

Herein using polyester polyol (1) as the polyol and a blocked isocyanate (Desmodur XP7001 or Desmodur BL4165) as the curing agent, the formulations as in Table 3 were processed in the same manner as for Comparative Sample 1, to obtain coating compositions. These were separately applied onto steel sheets and baked in the same manner as for Comparative Sample 1 to obtain precoated steel sheets.
Comparative Samples 4 and 5

Herein using polyester polyol (2) or an acrylic polyol (Desmophen A365) as the polyol and a methylated melamine (Cymel 300) or a blocked isocyanate (Desmodur BL3175) as the curing agent, the formulations as in Table 3 were processed in the same manner as for Comparative Sample 1, to obtain coating compositions. These were separately applied onto steel sheets and baked in the same manner as for Comparative Sample 1 to obtain precoated steel sheets.
Comparative Samples 6 to 8

Herein using compound (I-5) as the polyester compound, the formulations as in Table 4 were prepared in the same manner as for Samples 1, 7 and 8 of the invention mentioned above. These were processed in the same manner as for Sample 1 of the invention to obtain coating compositions. These coating compositions were separately applied onto steel sheets and baked in the same manner as for Sample 1 of the invention to obtain precoated steel sheets.
Comparative Samples 9 to 11

Herein using compound (I-10) as the polyester compound, the formulations as in Table 4 were prepared in the same manner as for Comparative Samples 6 to 8 mentioned above. These were processed in the same manner as for Sample 1 of the invention mentioned above to obtain coating compositions. These coating compositions were separately applied onto steel sheets and baked in the same manner as for Sample 1 of the invention to obtain precoated steel sheets.
Comparative Samples 12 to 17

Herein using compound (I-1) or compound (I-10) as the polyester compound, prepared were coating compositions as in Table 5. These were separately applied onto steel sheets and baked to obtain precoated steel sheet. The proportion of the polyester compound (in the resin composition) was controlled to be 0.5% by weight in Comparative Sample 12, 18.0% by weight in Comparative Samples 13, 15 and 17, and 15% by weight in Comparative Samples 14 and 16. As the polyol, polyester polyol (2) was used in Comparative Samples 15 and 16, and polyester polyol (1) in Comparative Samples 12 to 14 and 17. As the curing agent, methylated melamine (Cymel 300) was used in Comparative Samples 15 and 16, and blocked isocyanate (Desmodur BL3175) in Comparative Samples 12 to 14 and 17. The preparation of the coating compositions and the method of coating and baking them were the same as those for Sample 1 of the invention mentioned above.

Referring to Comparative Samples 13 to 17, the dispersibility of the constitutive components in the solvent was lowered with the increase in the proportion of the polyester compound in each coating composition, and the outward appearance of the coating films formed was not on the level of precoated steel sheets at all.
Comparison of Samples 1 and 9 of the invention with Comparative Sample 1

The glass transition point of the coating films containing compound (I-1) or (I-2) which is the polyester compound defined by the present invention (that is, the coating films of Samples 1 and 9 of the invention) and the coating film not containing the polyester compound was measured, using a thermomechanometric tester. The data obtained are shown in Table 6. The glass transition point of the coating films of Sample 1 and Sample 9 of the invention, containing compounds (I-1) and (I-2), respectively, was higher than that of the coating film of Comparative Sample 1. In general, the higher the glass transition point, the higher the hardness of the coating film. As a result of the test for pencil hardness, the hardness of Sample 1 of the invention was H, that of Sample 9 of the invention was 2H, and that of Comparative Sample 1 was F, which thus corresponded to the data of the glass transition point of the films. On the other hand, the flexibility of Samples 1 and 9 of the invention was not lowered, and this may be considered because of the particular action of the polyester compound used. In addition, coating films having a higher glass transition point may have more improved stain resistance, blocking resistance and chemical resistance. Accordingly, it is understood that the other properties of the films, in addition to the hardness and the workability thereof, to be formed from the coating compositions of the present invention are also improved.

[Example 2]

Using the above-mentioned polyester compounds (II-1) to (II-4) and polyols (1) and (2), prepared were coating compositions, which were applied to steel sheets to produce precoated steel sheets, samples of the invention and comparative samples mentioned below. The properties of the films of these samples were examined. The results are shown in Tables 7 to 10, along with the formulations of the coating compositions.

Sample 1 of the invention 1.8 parts of polyester compound (II-1), 95.2 parts by weight of polyester polyol (1), 41.8 parts by weight of blocked isocyanate (Desmodur BL3175), 80.0 parts by weight or rutile-type titanium oxide, 10.0 parts by weight of a 10% solution of DBTDL in cyclohexanone, and 4.4 parts by weight of a 50% solution of Acronal 4F in cyclohexanone were mixed and dispersed for 1 hour, using a sand mill containing therein glass beads having a diameter of about 1 mm. The resulting dispersion was made to have a non-volatile content of 60% by weight by adding cyclohexanone thereto to obtain a coating composition. Using a bar coater, this was applied onto an electrolytic zinc-plated steel sheet (thickness: 0.5 mm) that had been processed by chromate treatment and undercoated with a polyester primer (film thickness: 4 $\mu$m), at a dry film thickness of from 15 to 18 $\mu$m, and then baked in a hot-air drying furnace at 230° C. for 50 seconds. Thus was obtained a precoated steel sheet.

Samples 2 to 7 of the invention

Coating compositions were prepared as in Table 7. In Samples 2 to 4, the amount of polyester compound (II-1) was varied in such a manner that the proportion of compound (II-1) in each resin composition was 5.0% by weight, 10.0% by weight and 22.0% by weight in Sample 2, Sample 3 and Sample 4, respectively. In Samples 5 to 7 where compound (II-1) was used, the polyol and the curing used were varied while the additive and the catalyst were also varied in accordance with these. Precisely, in Sample 5 used was an IPDI-type blocked isocyanate as the curing agent; in Sample 6 used was an amino resin as the same; and in Sample 7 used was an acrylic polyol as the polyol. These coating compositions were prepared, applied to steel sheets and baked in the same manner as for Sample 1 of the invention mentioned above.

Samples 8 to 13 of the invention

Coating compositions were prepared as in Table 8. In Samples 8 to 10, used was compound (II-2) in place of compound (II-1) in Samples 2 to 4 of the invention mentioned above. In Samples 11 to 13, used was compound (II-3) in place of compound (II-1) in Samples 2 to 4 of the invention. These coating compositions were prepared, applied to steel sheets and baked in the same manner as for Sample 1 of the invention mentioned above.

Comparative Sample 1

99.7 parts by weight of polyester polyol (1),.40.3 parts by weight of blocked isocyanate (Desmodur BL3175), 80.0 parts by weight of rutile-type titanium oxide, 10.0 parts by weight of a 10% solution of DBTDL in cyclohexanone, and 4.4 parts by weight of a 50% solution of Acronal 4F in cyclohexanone were mixed and dispersed for 1 hour, using a sand mill containing therein glass beads having a diameter of about 1 mm. The resulting dispersion was made to have a non-volatile content of 60% by weight by adding cyclohexanone thereto to obtain a coating composition. This was applied to a steel sheet and baked in the same manner as for Sample 1 of the invention mentioned above.

Comparative Samples 2 to 4

Coating compositions were prepared in the same manner as in the preparation of the coating composition for Comparative Sample 1 mentioned above, except that the polyol, the curing agent, the additive and the catalyst were varied to those in Table 9. These were separately applied onto steel sheets and baked in the same manner as for Sample 1 of the invention mentioned above.

Comparative Samples 5 and 6

Herein used was 0.5% by weight or 35.0% by weight of compound (II-1). Coating compositions were prepared, applied onto steel sheets and baked in the same manner as for Sample 1 of the invention mentioned above.

Comparative Samples 7 to 9

40 parts by weight of cyclohexanone was added to 5.0 parts by weight of polyester compound (II-4), and stirred for 12 hours. Compound (II-4) was ground, using a grinder, into a powder of 250$\mu$ or less, prior to being used herein. 88.4 parts by weight of polyester polyol (1), 44.2 parts by weight of blocked isocyanate (Desmodur BL3175), 80.0 parts by weight of rutile-type titanium oxide, 10.0 parts by weight of a 10% solution of DBTDL in cyclohexanone, and 4.4 parts by weight of a 50% solution of Acronal 4F in cyclohexanone were added to the resulting dispersion of compound (II-4) in cyclohexanone, and dispersed for 1 hour, using a sand mill containing therein glass beads having a diameter of about 1 mm. The resulting dispersion was made to have a non-volatile content of 60% by weight, by adding cyclohexanone thereto, to obtain a coating composition for Comparative Sample 7. Coating compositions for Comparative Samples 8 and 9 were prepared in the same manner, but varying the proportion of compound (II-4). These coating compositions were applied onto steel sheets and baked in the same manner as for Sample 1 of the invention mentioned above.

Evaluation of Samples of Example 2

The properties of the precoating films as formed from the coating compositions in Samples 1 to 13 of the invention were much better than those of the precoating films as formed from the coating compositions in Comparative Samples 1 to 4 which did not contain any of compounds (II-1) to (II-3) falling within the scope of the polyester compound defined by the present invention, with respect to the film hardness, weather resistance in the forced test, and also the impact resistance and the flexibility. In addition, as compared with the coating films as formed from the coating compositions in Comparative Samples 7 to 9 that contained compound (II-4) having a terephthalic acid skeleton, in place of any of compound (II-1) to (II-3), the weather resistance and the flexibility of the coating films in the samples of the invention were found much improved.

[Example 3]

Using the above-mentioned compounds (III-1) to (III-3) and polyols (1) and (2), prepared were coating compositions, which were applied to steel sheets to produce precoated steel sheets, samples of the invention and comparative samples mentioned below. The properties of the films of these samples were examined. The results are shown in Tables 11 to 14, along with the formulations of the coating compositions.

Sample 1 of the invention 40 parts by weight of cyclohexanone was added to 5.0 parts by weight of compound (III-1), and stirred for 12 hours. Compound (III-1) was ground, using a grinder, into a powder of 250μ or less, prior to being used herein. 77.4 parts by weight of polyester polyol (1), 54.5 parts by weight of blocked isocyanate (Desmodur BL4165), and 10.0 parts by weight of a 10% solution of DBTDL in cyclohexanone were added to the resulting dispersion of compound (III-1) in cyclohexanone. The resulting mixture was adjusted to have a non-volatile content of 60% by weight, by adding cyclohexanone thereto, to obtain a colorless, transparent coating composition. Using a bar coater, this was applied onto an electrolytic zinc-plated steel sheet (thickness: 0.5 mm) that had been processed by chromate treatment and undercoated with a polyester primer (film thickness: 4 μm), and then baked in a hot-air drying furnace at 230° C. for 50 seconds. Thus was obtained a precoated steel sheet. The coating film was controlled to have a dry thickness of 12 μm±1 μm.

Samples 2 and 3 of the invention

Coating compositions were prepared in the same manner as for Sample 1 of the invention mentioned above. Using a bar coater, these coating compositions were separately applied onto electrolytic zinc-plated steel sheets (thickness: 0.5 mm) that had been processed by chromate treatment and undercoated with a polyester primer (film thickness: 4 μm), and then baked in a hot-air drying furnace at 230° C. for 50 seconds. Thus were obtained precoated steel sheets. The coating film was controlled to have a dry thickness of 16 μm±1 μm (in Sample 2) and a dry thickness of 8 μm±1 μm (in Sample 3). Thus, the coating film of Sample 2 was thicker by 4 μm than that of Sample 1; while the coating film of Sample 3 was thinner by 4 μm than that of Sample 1.

Samples 4 and 5 of the invention

The polyol, the curing agent, the catalyst and the additive as in Table 11 were added to the dispersion of compound (III-1) in cyclohexanone that had been prepared in the same manner as for Sample 1 of the invention mentioned above, to obtain coating compositions. In Sample 4 was used an amino resin as the curing agent; and in Sample 5 was used an acrylic polyol as the polyol. These coating compositions were applied onto steel sheets and baked in the same manner as for Sample 1 of the invention.

Sample 6 of the invention 88.4 parts by weight of polyester polyol(1), 44.1 parts by weight of blocked isocyanate (Desmodur BL3175), 100.0 parts by weight of rutile-type titanium oxide, 10.0 parts by weight of a 10% solution of DBTDL in cyclohexanone, and 4.4 parts by weight of a 50% solution of Acronal 4F in cyclohexanone were added to the dispersion of 5 parts by weight of compound (III-1) in cyclohexanone that had been prepared in the same manner as for Sample 1 of the invention mentioned above, and dispersed for 1 hour, using a sand mill containing therein glass beads having a diameter of about 1 mm. The resulting mixture was adjusted to have a non-volatile content of 60% by weight, by adding cyclohexanone thereto, to obtain a white coating composition. This was applied onto a steel sheet and baked in the same manner as for Sample 1, in which the coating film was controlled to have a dry thickness of 14 μm±1 μm.

Samples 7 and 8 of the invention

Coating compositions were prepared in the same manner as for Sample 6 of the invention mentioned above. Using a bar coater, these coating compositions were applied onto steel sheets and baked in the same manner as for Sample 6 to obtain precoated steel sheets. The coating film was controlled to have a dry thickness of 18 μm±1 μm (in Sample 7) and a dry thickness of 10 μm±1 μm (in Sample 8). Thus, the coating film of Sample 7 was thicker by 4 μm than that of Sample 6; while the coating film of Sample 8 was thinner by 4 μm than that of Sample 6.

Samples 9 and 10 of the invention

Coating compositions were prepared in the same manner as in the coating composition for Sample 6 of the invention mentioned above, except that the amount of compound (III-1) added was varied. These were applied onto steel sheets and baked in the same manner as for Sample 1 of the invention mentioned above.

Samples 11 to 13 of the invention

The polyol, the curing agent, the catalyst and the additive as in Table 12 were added to the dispersion of compound (III-1) in cyclohexanone that had been prepared in the same manner as for Sample 6 of the invention mentioned above, to obtain coating compositions. In Sample 11 was used an IPDI-type blocked isocyanate as the curing agent; in Sample 12 was used an amino resin as the curing agent; and in Sample 13 was used an acrylic polyol as the polyol. These coating compositions were applied onto steel sheets and baked in the same manner as for Sample 1 of the invention.

Sample 14 of the invention

A coating composition was prepared in the same manner as for Sample 6 of the invention mentioned above, using the same polyol, curing agent, catalyst and additive as those in the composition for Sample 6 but using compound (III-2) in place of compound (III-1). This was applied onto a steel sheet and baked in the same manner as for Sample 1 of the invention mentioned above.

Comparative Samples 1 to 3

For Comparative Sample 1, prepared was a colorless, transparent coating composition by mixing 83.8 parts by weight of polyester polyol (1), 46.5 parts by weight of blocked isocyanate (Desmodur BL4165) and 10.0 parts by weight of a 10% solution of DBTDL in cyclohexanone, followed by adding cyclohexanone thereto to make the resulting mixture have a non-volatile content of 60% by weight. Coating compositions for Comparative Samples 2 and 3 as in Table 13 were prepared in the same manner as for Comparative Sample 1. Precisely, an amino resin was used as the curing agent in Comparative Sample 2, and an acrylic polyol was used as the polyol in Comparative Sample 3. These coating compositions were applied onto steel sheets and baked in the same manner as for Sample 1 of the invention mentioned above.

Comparative Samples 4 to 7

For Comparative Sample 4, 99.7 parts by weight of polyester polyol (1), 40.3 parts by weight of blocked isocyanate (Desmodur BL3175), 100.0 parts by weight of rutile-type titanium oxide, 10.0 parts by weight of a 10% solution of DBTDL in cyclohexanone, and 4.4 parts by weight of a 50% solution of Acronal4F in cyclohexanone were mixed, and then dispersed for 1 hour, using a sand mill containing therein glass beads having a diameter of about 1 mm. The resulting dispersion was made to have a non-volatile content of 60% by weight, by adding cyclohexanone thereto, to obtain a white coating composition. Coating compositions for Comparative Samples 5 to 7 as in Table 13 were prepared in the same manner as above. Precisely, an IPDI-type blocked isocyanate was used as the curing agent for Comparative Sample 5, and an amino resin was used as the same for Comparative Sample 6. For Comparative Sample 8 used was an acrylic polyol as the polyol. These coating compositions were applied onto steel sheets and baked in the same manner as for Sample 1 of the invention mentioned above.

Comparative Samples 8 and 9

Coating compositions as in Table 13 were prepared in the same manner as for Sample 1 of the invention mentioned above, except that compound (III-3) was used in place of compound (III-1). These coating compositions were applied onto steel sheets and baked in the same manner as for Sample 1 of the invention.

Reference Samples 1 and 2

Coating compositions were prepared in the same manner as for Sample 6 of the invention mentioned above, except that the amount of compound (III-1) added was varied. These were applied onto steel sheets and baked in the same manner as for Sample 1 of the invention mentioned above.

Evaluation of Samples in Example 3

The coating compositions for Samples 1 to 5 of the invention are for clear films. The properties of the precoating films as formed from these coating compositions are much better than those of the films as formed from the coating compositions for Comparative Samples 1 to 3 not containing any of compound (III-1) and compound (III-2) both falling within the scope of the present invention, and also than those of the film as formed from the coating composition for Comparative Sample 8 containing compound (III-3), especially with respect to the flexibility, the impact resistance and the chemical resistance. The coating compositions for Samples 6 to 14 of the invention are for white coats. The properties of the precoating films as formed from these coating compositions are much better than those of the films as formed from the coating compositions for Comparative Samples 4 to 7 not containing any of compound (III-1) and compound (III-2) both falling within the scope of the present invention, and also than those of the film as formed from the coating composition for Comparative Sample 9 containing compound (III-3), especially with respect to the hardness, the flexibility and the impact resistance. The precoating films of the present invention, even being relatively thin to have a thickness of from 10 to 12 $\mu$m or so, have good chemical resistance.

TABLE 1

| Sample No. of the Invention | | 1 | 2 | 3 | 4 | 5 | 6 | 7 | 8 |
|---|---|---|---|---|---|---|---|---|---|
| Compound (I-1) | | 1.8 | 4.8 | 8.0 | 12.0 | 5.0 | 5.0 | 5.0 | 5.0 |
| Polyol | Polyester Polyol (1) | 94.0 | 86.0 | 76.8 | 65.4 | 77.3 | 79.1 | — | — |
| | Polyester Polyol (2) | — | — | — | — | — | — | 125.0 | — |
| | Desmophen A365 | — | — | — | — | — | — | — | 76.7 |
| Curing Agent | Desmodur BL3175 | 43.0 | 46.7 | 51.0 | 56.3 | — | — | — | 60.2 |
| | Desmodur XP7001 | — | — | — | — | 54.5 | — | — | — |
| | Desmodur BL4165 | — | — | — | — | — | 52.9 | — | — |
| | Cymel 300 | — | — | — | — | — | — | 20.0 | — |
| Pigment | Rutile-type Titanium Oxide | 80.0 | 80.0 | 80.0 | 80.0 | 80.0 | 80.0 | 80.0 | 80.0 |
| Curing Promoter | DBTDL (10 % solution in cyclohexanone) | 10.0 | 10.0 | 10.0 | 10.0 | 10.0 | 10.0 | — | 10.0 |
| | P-toluenesulfonic Acid | — | — | — | — | — | — | 0.5 | — |
| Additive | Acronal 4F (50% solution in cyclohexanone) | 4.4 | 4.4 | 4.4 | 4.4 | 4.4 | 4.4 | — | 4.4 |
| Properties of Film | Gloss (%) | 81.0 | 80.8 | 79.0 | 75.3 | 85.2 | 83.8 | 82.1 | 80.0 |
| | Pencil Hardness | H | H | H | H | 2H | 2H | H | 2H |
| | Flexibility | 0T | 0T | 0T | 1T | 0T | 0T | 1T | 1T |
| | Adhesiveness (number of cross-cuts remained) | 100 | 100 | 100 | 100 | 100 | 100 | 100 | 100 |
| | Impact Resistance (kg-cm) | >75 | >75 | >75 | >75 | >75 | >75 | 50 | 70 |
| | MEK Rubbing Resistance (number of rubbing cycles) | >100 | >100 | >100 | >100 | >100 | >100 | >100 | >100 |

Note)
The amounts of the constitutive components are represented by "parts by weight".

TABLE 2

| Sample No. of the Invention | | 9 | 10 | 11 | 12 | 13 | 14 | 15 |
|---|---|---|---|---|---|---|---|---|
| Compound (I-2) | | 5.0 | — | — | — | — | — | — |
| Compound (I-3) | | — | 5.0 | — | — | — | — | — |
| Compound (I-4) | | — | — | 5.0 | — | — | — | — |
| Compound (I-6) | | — | — | — | 5.0 | — | — | — |
| Compound (I-7) | | — | — | — | — | 5.0 | — | — |
| Compound (I-8) | | — | — | — | — | — | 5.0 | — |
| Compound (I-9) | | — | — | — | — | — | — | 5.0 |
| Polyol | Polyester Polyol (1) | 86.9 | 88.7 | 87.4 | 87.5 | 89.8 | 92.7 | 92.8 |
| Curing Agent | Desmodur BL3175 | 45.6 | 43.9 | 45.1 | 45.0 | 42.8 | 40.2 | 40.1 |
| Pigment | Rutile-type Titanium Oxide | 80.0 | 80.0 | 80.0 | 80.0 | 80.0 | 80.0 | 80.0 |

TABLE 2-continued

| Sample No. of the Invention | | 9 | 10 | 11 | 12 | 13 | 14 | 15 |
|---|---|---|---|---|---|---|---|---|
| Curing Promoter | DBTDL(10% solution in cyclohexanone) | 10.0 | 10.0 | 10.0 | 10.0 | 10.0 | 10.0 | 10.0 |
| Additive | Acronal 4F (50% solution in cyclohexanone) | 4.4 | 4.4 | 4.4 | 4.4 | 4.4 | 4.4 | 4.4 |
| Properties of Film | Gloss (%) | 80.5 | 80.0 | 81.2 | 80.1 | 79.6 | 78.4 | 84.4 |
| | Pencil Hardness | 2H | 2H | 2H | 2H | H | F | H |
| | Flexibility | 0T | 0T | 1T | 1T | 0T | 0T | 0T |
| | Adhesiveness (number of cross-cuts remained) | 100 | 100 | 100 | 100 | 100 | 100 | 100 |
| | Impact Resistance (kg-cm) | >75 | >75 | 70 | >75 | >75 | >75 | >75 |
| | MEK Rubbing Resistance (number of rubbing cycles) | >100 | >100 | >100 | >100 | >100 | >100 | >100 |

Note)
The amounts of the constitutive components are represented by "parts by weight".

TABLE 3

| Comparative Sample No. | | 1 | 2 | 3 | 4 | 5 |
|---|---|---|---|---|---|---|
| Polyol | Polyester Polyol (1) | 99.7 | 92.7 | 94.3 | — | — |
| | Polyester Polyol (2) | — | — | — | 133.0 | — |
| | Desmophen A365 | — | — | — | — | 89.5 |
| Curing Agent | Desmodur BL3175 | 40.3 | — | — | — | 55.8 |
| | Desmodur XP7001 | — | 46.8 | — | — | — |
| | Desmodur BL4165 | — | — | 45.4 | — | — |
| | Cymel 300 | — | — | — | 20.0 | — |
| Pigment | Rutile-type Titanium Oxide | 80.0 | 80.0 | 80.0 | 80.0 | 80.0 |
| Curing Promoter | DBTDL(10% solution in cyclohexanone) | 10.0 | 10.0 | 10.0 | — | 10.0 |
| | P-toluenesulfonic Acid | — | — | — | 0.5 | — |
| Additive | Acronal 4F (50% solution in cyclohexanone) | 4.4 | 4.4 | 4.4 | — | 4.4 |
| Properties of Film | Gloss (%) | 81.1 | 84.2 | 82.9 | 80.3 | 79.0 |
| | Pencil Hardness | F | F | 2H | F | H |
| | Flexibility | 1T | 1T | 5T | 2T | 3T |
| | Adhesiveness (number of cross-cuts remained) | 100 | 100 | 100 | 100 | 100 |
| | Impact Resistance (kg-cm) | 70 | 70 | 30 | 50 | 40 |
| | MEK Rubbing Resistance (number of rubbing cycles) | >100 | >100 | >100 | >100 | >100 |

Note)
The amounts of the constitutive components are represented by "parts by weight".

TABLE 4

| Comparative Sample No. | | 6 | 7 | 8 | 9 | 10 | 11 |
|---|---|---|---|---|---|---|---|
| Compound (I-5) | | 5.0 | 5.0 | 5.0 | — | — | — |
| Compound (I-10) | | — | — | — | 5.0 | 5.0 | 5.0 |
| Polyol | Polyester Polyol (1) | 83.6 | — | — | 92.7 | — | — |
| | Polyester Polyol (2) | — | 125.0 | — | — | 125.0 | — |
| | Desmophen A365 | — | — | 75.1 | — | — | 83.3 |
| Curing Agent | Desmodur BL3175 | 48.7 | — | 61.6 | 40.1 | — | 54.5 |
| | Cymel 300 | — | 20.0 | — | — | 20.0 | — |
| Pigment | Rutile-type Titanium Oxide | 80.0 | 80.0 | 80.0 | 80.0 | 80.0 | 80.0 |
| Curing Promoter | DBTDL(10% solution in cyclohexanone) | 10.0 | — | 10.0 | 10.0 | — | 10.0 |
| | P-toluenesulfonic | — | 0.5 | — | — | 0.5 | — |

TABLE 4-continued

| Comparative Sample No. | | 6 | 7 | 8 | 9 | 10 | 11 |
|---|---|---|---|---|---|---|---|
| Acid Additive | Acranal 4F (50% solution in cyclohexanone) | 4.4 | — | 4.4 | 4.4 | — | 4.4 |
| Properties of Film | Gloss (%) | 80.2 | 79.8 | 78.3 | 80.5 | 78.8 | 78.9 |
| | Pencil Hardness | F | F | H | F | F | H |
| | Flexibility | 0T | 1T | 2T | 1T | 2T | 3T |
| | Adhesiveness (number of cross-cuts remained) | 100 | 100 | 100 | 100 | 100 | 100 |
| | Impact Resistance (kg-cm) | 70 | 50 | 50 | 70 | 50 | 50 |
| | MEK Rubbing Resistance (number of rubbing cycles) | >100 | >100 | >100 | >100 | >100 | >100 |

Note)
The amounts of the constitutive components are represented by "parts by weight".

TABLE 5

| Comparative Sample No. | | 12 | 13 | 14 | 15 | 16 | 17 |
|---|---|---|---|---|---|---|---|
| Compound (I-1) | | 0.5 | 18.0 | 25.0 | 18.0 | 25.0 | — |
| Compound (I-5) | | — | — | — | — | — | 18.0 |
| Polyol | Polyester Polyol (1) | 98.3 | 48.3 | 28.3 | — | — | 41.7 |
| | Polyester Polyol (2) | — | — | — | 103.3 | 91.7 | — |
| Curing Agent | Desmodur BL3175 | 41.0 | 64.3 | 73.6 | — | — | 70.4 |
| | Cymel 300 | — | — | — | 20.0 | 20.0 | — |
| Pigment | Rutile-type Titanium Oxide | 80.0 | 80.0 | 80.0 | 80.0 | 80.0 | 80.0 |
| Curing Promoter | DBTDL (10% solution in cyclohexanone) | 10.0 | 10.0 | 10.0 | — | — | 10.0 |
| | P-toluenesulfonic Acid | — | — | — | 0.5 | 0.5 | — |
| Additive | Acranal 4F (50% solution in cyclohexanone) | 4.4 | 4.4 | 4.4 | — | — | 4.4 |
| Properties of Film | Gloss (%) | 80.5 | 65.3 | 40.5 | 68.2 | 42.1 | 65.2 |
| | Pencil Hardness | F | 2H | 2H | 2H | 2H | 2H |
| | Flexibility | 1T | 5T | >5T | >5T | >5T | >5T |
| | Adhesiveness (number of cross-cuts remained) | 100 | 100 | 100 | 100 | 100 | 100 |
| | Impact Resistance (kg-cm) | 70 | 70 | 50 | 60 | 50 | 60 |
| | MEK Rubbing Resistance (number of rubbing cycles) | >100 | >100 | >100 | >100 | >100 | >100 |

Note)
The amounts of the constitutive components are represented by "parts by weight".

TABLE 6

| Formulation | Sample 1 of the Invention | Sample 9 of the Invention | Comparative Sample 1 |
|---|---|---|---|
| Compound (I-1) or Compound (I-2) | (I-1) | (I-2) | No |
| Glass Transition Point (°C.) | 47.7 | 48.2 | 45.5 |

TABLE 7

| Sample No. of the Invention | | 1 | 2 | 3 | 4 | 5 | 6 | 7 |
|---|---|---|---|---|---|---|---|---|
| Compound (II-1) | | 1.8 | 5.0 | 10.0 | 22.0 | 5.0 | 5.0 | 5.0 |
| Polyol | Polyester Polyol (1) | 95.2 | 88.5 | 77.4 | 50.6 | 77.5 | — | — |
| | Polyester Polyol (2) | — | — | — | — | — | 125.0 | — |
| | Desmophen A365 | — | — | — | — | — | — | 79.5 |
| Curing Agent | Desmodur BL3175 | 41.8 | 44.0 | 47.8 | 56.8 | — | — | 57.8 |
| | Desmodur BL4165 | — | — | — | — | 54.3 | — | — |
| | Cymel 300 | — | — | — | — | — | 20.0 | — |
| Pigment | Rutile-type Titanium Oxide | 80.0 | 80.0 | 80.0 | 80.0 | 80.0 | 80.0 | 80.0 |
| Curing Promoter | DBTDL (10 % solution in cyclohexanone) | 10.0 | 10.0 | 10.0 | 10.0 | 10.0 | — | 10.0 |
| | P-toluenesulfonic Acid | — | — | — | — | — | 0.5 | — |
| Additive | Acronal 4F (50% solution in cyclohexanone) | 4.4 | 4.4 | 4.4 | 4.4 | 4.4 | — | 4.4 |
| Properties of Film | Gloss(%) | 81.1 | 80.8 | 82.3 | 96.1 | 84.9 | 81.5 | 81.2 |
| | Pencil Hardness | H | 2H | 2H | 3H | 3H | H | 2H |
| | Flexibility | 0T | 0T | 0T | 2T | 2T | 0T | 1T |
| | Adhesiveness (number of cross-cuts remained) | 100 | 100 | 100 | 100 | 100 | 100 | 100 |
| | Impact Resistance (kg-cm) | >75 | >75 | >75 | >75 | 60 | 70 | >75 |
| | MEK Rubbing Resistance (number of rubbing cycles) | >100 | >100 | >100 | >100 | >100 | >100 | >100 |
| | Weather Resistance (gloss retention percentage, %) | 80 | 84 | 85 | 90 | 88 | 82 | 85 |

Note)
The amounts of the constitutive components are represented by "parts by weight".

TABLE 8

| Sample No. of the Invention | | 8 | 9 | 10 | 11 | 12 | 13 |
|---|---|---|---|---|---|---|---|
| Compound (II-2) | | 5.0 | 10.0 | 22.0 | — | — | — |
| Compound (II-3) | | — | — | — | 5.0 | 10.0 | 22.0 |
| Polyol | Polyester Polyol (1) | 88.5 | 77.4 | 50.6 | 90.2 | 80.7 | 57.9 |
| Curing Agent | Desmodur BL3175 | 44.0 | 47.8 | 56.8 | 42.5 | 44.7 | 50.0 |
| Pigment | Rutile-type Titanium Oxide | 80.0 | 80.0 | 80.0 | 80.0 | 80.0 | 80.0 |
| Curing Promoter | DBTDL (10% solution in cyclohexanone) | 10.0 | 10.0 | 10.0 | 10.0 | 10.0 | 10.0 |
| Additive | Acronal 4F (50% solution in cyclohexanone) | 4.4 | 4.4 | 4.4 | 4.4 | 4.4 | 4.4 |
| Properties of Film | Gloss (%) | 81.2 | 82.2 | 96.2 | 81.2 | 82.2 | 96.2 |
| | Pencil Hardness | 2H | 2H | 3H | 2H | 2H | 3H |
| | Flexibility | 0T | 0T | 2T | 0T | 0T | 2T |
| | Adhesiveness (number of cross-cuts remained) | 100 | 100 | 100 | 100 | 100 | 100 |
| | Impact Resistance (kg-cm) | >75 | >75 | >75 | >75 | >75 | >75 |
| | Weather Resistance (gloss retention percentage, %) | 85 | 86 | 92 | 84 | 85 | 90 |

Note)
The amounts of the constitutive components are represented by "parts by weight".

TABLE 9

| | | Comparative Sample No. | | | |
|---|---|---|---|---|---|
| | | 1 | 2 | 3 | 4 |
| Polyol | Polyester Polyol (1) | 99.7 | 83.8 | — | — |
| | Polyester Polyol (2) | — | — | 133.0 | — |
| | Desmophen A365 | — | — | — | 89.5 |
| Curing Agent | Desmodur BL3175 | 40.3 | — | — | 55.8 |
| | Desmodur BL4165 | — | 46.5 | — | — |
| | Cymel 300 | — | — | 20.0 | — |
| Pigment | Rutile-type Titanium Oxide | 80.0 | 80.0 | 80.0 | 80.0 |
| Curing Promoter | DBTDL (10% solution in cyclohexanone) | 10.0 | 10.0 | — | 10.0 |
| | P-toluenesulfonic Acid | — | — | 0.5 | — |
| Additive | Acronal 4F (50% solution in cyclohexanone) | 4.4 | 4.4 | — | 4.4 |
| Properties of Film | Gloss (%) | 81.1 | 82.9 | 81.3 | 81.5 |
| | Pencil Hardness | F | 2H | F | H |
| | Flexibility | 1T | 3T | 2T | 3T |
| | Adhesiveness (number of cross-cuts remained) | 100 | 100 | 100 | 100 |
| | Impact Resistance (kg-cm) | 70 | 30 | 50 | 40 |
| | MEK Rubbing Resistance (number of rubbing cycles) | >100 | >100 | >100 | >100 |
| | Weather Resistance (gloss retention percentage, %) | 75 | 80 | 65 | 80 |

Note) The amounts of the constitutive components are represented by "parts by weight".

TABLE 10

| | | Comparative Sample No. | | | | |
|---|---|---|---|---|---|---|
| | | 5 | 6 | 7 | 8 | 9 |
| Compound (II-1) | | 0.5 | 35.0 | — | — | — |
| Compound (II-4) | | — | — | 5.0 | 10.0 | 22.0 |
| Polyol | Polyester Polyol (1) | 98.6 | 21.6 | 88.4 | 77.0 | 48.7 |
| Curing Agent | Desmodur BL3175 | 40.7 | 66.5 | 44.2 | 48.1 | 58.5 |
| Pigment | Rutile-type Titanium Oxide | 80.0 | 80.0 | 80.0 | 80.0 | 80.0 |
| Curing Promoter | DBTDL (10% solution in cyclohexanone) | 10.0 | 10.0 | 10.0 | 10.0 | 10.0 |
| Additive | Acronal 4F (50% solution in cyclohexanone) | 4.4 | 4.4 | 4.4 | 4.4 | 4.4 |
| Properties of Film | Gloss (%) | 80.5 | 78.5 | 80.2 | 70.3 | 63.5 |
| | Pencil Hardness | F | 2H | F | 2H | 2H |
| | Flexibility | 1T | >5T | 0T | >5T | >5T |
| | Adhesiveness (number of cross-cuts remained) | 100 | 100 | 100 | 100 | 100 |
| | Impact Resistance (kg-cm) | 70 | 40 | 70 | 60 | 60 |
| | MEK Rubbing Resistance (number of rubbing cycles) | >100 | >100 | >100 | >100 | >100 |
| | Weather Resistance (gloss retention percentage, %) | 75 | 78 | 70 | 45 | 30 |

Note) The amounts of the constitutive components are represented by "parts by weight".

TABLE 11

| | | Sample No. of the Invention | | | | |
|---|---|---|---|---|---|---|
| | | 1 | 2 | 3 | 4 | 5 |
| Compound (III-1) | | 5.0 | 5.0 | 5.0 | 5.0 | 5.0 |
| Polyol | Polyester Polyol (1) | 77.4 | 77.4 | 77.4 | — | — |
| | Polyester Polyol (2) | — | — | — | 125.0 | — |
| | Desmophen A365 | — | — | — | — | 79.4 |
| Curing Agent | Desmodur BL4165 | 54.5 | 54.5 | 54.5 | — | — |
| | Cymel 300 | — | — | — | 20.0 | — |
| | Desmodur BL3175 | — | — | — | — | 57.8 |
| Curing Promoter | DBTDL (10% solution in cyclohexanone) | 10.0 | 10.0 | 10.0 | — | 10.0 |
| | P-toluenesulfonic Acid | — | — | — | 0.5 | — |
| Properties of Film | Film Thickness ($\mu$) | 12.5 | 16.3 | 8.6 | 11.6 | 12.0 |
| | Gloss (%) | 91.2 | 90.2 | 91.5 | 85.6 | 87.6 |
| | Pencil Hardness | 3H | 3H | 3H | 2H | 2H |
| | Flexibility | 0T | 1T | 0T | 0T | 0T |
| | Adhesiveness (number of cross-cuts remained) | 100 | 100 | 100 | 100 | 100 |
| | Impact Resistance (kg-cm) | >75 | >75 | >75 | >75 | >75 |
| | MEK Rubbing Resistance (number of rubbing cycles) | >100 | >100 | >100 | >100 | >100 |
| | Chemical Resistance (against acid) | 5 | 5 | 4 | 5 | 5 |
| | Chemical Resistance (against alkali) | 5 | 5 | 4 | 5 | 5 |

Note) The amounts of the constitutive components are represented by "parts by weight".

TABLE 12

| | | Sample No. of the Invention | | | | | | | | |
|---|---|---|---|---|---|---|---|---|---|---|
| | | 6 | 7 | 8 | 9 | 10 | 11 | 12 | 13 | 14 |
| Compound (III-1) | | 5.0 | 5.0 | 5.0 | 1.8 | 12.0 | 5.0 | 5.0 | 5.0 | — |
| Compound (III-2) | | — | — | — | — | — | — | — | — | 5.0 |
| Polyol | Polyester Polyol (1) | 88.4 | 88.4 | 88.4 | 95.6 | 72.7 | 77.4 | — | — | 87.4 |

TABLE 12-continued

| | | Sample No. of the Invention | | | | | | | | |
|---|---|---|---|---|---|---|---|---|---|---|
| | | 6 | 7 | 8 | 9 | 10 | 11 | 12 | 13 | 14 |
| | Polyester Polyol (2) | — | — | — | — | — | — | 125.0 | — | — |
| | Desmophen A365 | — | — | — | — | — | — | — | 79.4 | — |
| Curing Agent | Desmodur BL3175 | 44.1 | 44.1 | 44.1 | 41.7 | 49.5 | — | — | 57.8 | 45.1 |
| | Desmodur BL4165 | — | — | — | — | — | 54.5 | — | — | — |
| | Cymel 300 | — | — | — | — | — | — | 20.0 | — | — |
| Pigment | Rutile-type Titanium Oxide | 100.0 | 100.0 | 100.0 | 100.0 | 100.0 | 100.0 | 100.0 | 100.0 | 100.0 |
| Curing Promoter | DBTDL (50% solution in cyclohexanone) | 10.0 | 10.0 | 10.0 | 10.0 | 10.0 | 10.0 | — | 10.0 | 10.0 |
| | P-toluenesulfonic Acid | — | — | — | — | — | — | 0.5 | — | — |
| Additive | Acronal 4F (50% solution in cyclohexanone) | 4.4 | 4.4 | 4.4 | 4.4 | 4.4 | 4.4 | — | 4.4 | 4.4 |
| Properties of Film | Film Thickness (μ) | 14.2 | 18.3 | 10.5 | 14.1 | 14.3 | 14.5 | 13.8 | 14.0 | 14.3 |
| | Gloss (%) | 84.9 | 80.8 | 81.5 | 83.2 | 82.3 | 87.5 | 81.5 | 81.2 | 83.5 |
| | Pencil Hardness | 3H | 3H | 3H | 2H | 2H | 4H | 2H | 3H | 3H |
| | Flexibility | 0T | 1T | 0T | 1T | 0T | 1T | 0T | 1T | 0T |
| | Adhesiveness (number of cross-cuts remained) | 100 | 100 | 100 | 100 | 100 | 100 | 100 | 100 | 100 |
| | Impact Resistance (kg-cm) | >75 | >75 | >75 | >75 | >75 | 70 | >75 | >75 | >75 |
| | MEK Rubbing Resistance (number of rubbing cycles) | >100 | >100 | >100 | >100 | >100 | >100 | >100 | >100 | >100 |
| | Chemical Resistance (against acid) | 5 | 5 | 5 | 5 | 5 | 5 | 5 | 5 | 5 |
| | Chemical Resistance (against alkali) | 5 | 5 | 5 | 5 | 5 | 5 | 5 | 5 | 5 |

Note) The amounts of the constitutive components are represented by "parts by weight".

TABLE 13

| | | Comparative Sample No. | | | | | | | | |
|---|---|---|---|---|---|---|---|---|---|---|
| | | 1 | 2 | 3 | 4 | 5 | 6 | 7 | 8 | 9 |
| Compound (III-3) | | — | — | — | — | — | — | — | 5.0 | 5.0 |
| Polyol | Polyester Polyol (1) | 83.8 | — | — | 99.7 | 83.8 | — | — | 83.0 | 95.0 |
| | Polyester Polyol (2) | — | 133.0 | — | — | — | 133.0 | — | — | — |
| | Desmophen A365 | — | — | 89.5 | — | — | — | 89.5 | — | — |
| Curing Agent | Desmodur BL3175 | — | — | 55.8 | 40.3 | — | — | 55.8 | — | 44.4 |
| | Desmodur BL4165 | 46.5 | — | — | — | 46.5 | — | — | 54.7 | — |
| | Cymel 300 | — | 20.0 | — | — | — | 20.0 | — | — | — |
| Pigment | Rutile-type Titanium Oxide | — | — | — | 100.0 | 100.0 | 100.0 | 100.0 | — | 100.0 |
| Curing Promoter | DBTDL (50% solution in cyclohexanone) | 10.0 | — | 10.0 | 10.0 | 10.0 | — | 10.0 | 10.0 | 10.0 |
| | P-toluenesulfonic Acid | — | 0.5 | — | — | — | 0.5 | — | — | — |
| Additive | Acronal 4F (50% solution in cyclohexanone) | — | — | — | 4.4 | 4.4 | — | 4.4 | — | 4.4 |
| Properties of Film | Film Thickness (μ) | 12.0 | 12.8 | 12.3 | 14.2 | 14.8 | 14.6 | 14.4 | 12.3 | 14.2 |
| | Gloss (%) | 90.5 | 84.6 | 86.5 | 81.5 | 82.9 | 81.3 | 81.5 | 88.3 | 80.2 |
| | Pencil Hardness | 2H | H | H | F | 2H | F | H | 2H | F |
| | Flexibility | 5T | 2T | 3T | 1T | 5T | 2T | 2T | 5T | 1T |
| | Adhesiveness (number of cross-cuts remained) | 100 | 100 | 100 | 100 | 100 | 100 | 100 | 100 | 100 |
| | Impact Resistance (kg-cm) | 60 | 50 | 40 | 70 | 30 | 50 | 50 | 30 | 70 |
| | MEK Rubbing Resistance (number of rubbing cycles) | >100 | >100 | >100 | >100 | >100 | >100 | >100 | >100 | >100 |
| | Chemical Resistance (against acid) | 3 | 3 | 3 | 4 | 4 | 4 | 4 | 3 | 3 |
| | Chemical Resistance (against alkali) | 3 | 3 | 3 | 4 | 4 | 4 | 4 | 3 | 3 |

Note) The amounts of the constitutive components are represented by "parts by weight".

TABLE 14

| | | Reference Sample No. 1 | 2 |
|---|---|---|---|
| Compound (III-1) | | 0.5 | 18.0 |
| Polyol | Polyester Polyol (1) | 98.6 | 59.2 |
| Curing Agent | Desmodur BL3175 | 40.7 | 54.1 |
| Pigment | Rutile-type Titanium Oxide | 100.0 | 100.0 |
| Curing Promoter | DBTDL (50% solution in cyclohexanone) | 10.0 | 10.0 |
| Additive | Acronal 4F (50% solution in cyclohexanone) | 4.4 | 4.4 |
| Properties of Film | Film thickness (μ) | 14.0 | 14.2 |
| | Gloss (%) | 81.8 | 81.5 |
| | Pencil Hardness | F | 2H |
| | Flexibility | 1T | 3T |
| | Adhesiveness (number of cross-cuts remained) | 100 | 100 |
| | Impact Resistance (kg-cm) | 70 | 70 |
| | MEK Rubbing Resistance (number of rubbing cycles) | >100 | >100 |
| | Chemical Resistance (against acid) | 4 | 4 |
| | Chemical Resistance (against alkali) | 4 | 4 |

Note) The amounts of the constitutive components are represented by "parts by weight".

We claim:

1. A coating composition for precoated steel sheets, which consists essentially of:

i) from 1 to 15% by weight of a polyester compound comprising main repeating units of a general formula:

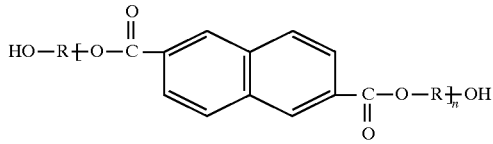

wherein n represents an integer; and R represents an alkylene group having 10 or less carbon atoms, or a 1,4-cyclohexylene-dimethylene group, or a neopentylene group, or a polyoxyalkylene group;

ii) a polyol; and iii) a curing agent.

2. The coating composition for precoated steel sheets as claimed in claim 1, wherein R in the general formula representing the polyester compound in i) is a 1,4-cyclohexylene-dimethylene group, or a neopentylene group, or a polyoxyalkylene group.

3. The coating composition for precoated steel sheets as claimed in claim 2, wherein R in the general formula representing the polyester compound in i) is a polyoxyalkylene group.

4. The coating composition for precoated steel sheets as claimed in claim 3, wherein the polyester compound has a reduced viscosity of 0.20 dl/g or less.

5. The coating composition for precoated steel sheets as claimed in claim 1, 2, 3 or 4, wherein the polyol in ii) comprises a polyester polyol except the polyester compound in i), and/or an acrylic polyol.

6. The coating composition for precoated steel sheets as claimed in claim 5, wherein the polyester polyol is a compound having at least two hydroxyl groups in one molecule and having a number average molecular weight of from 1000 to 50000.

7. The coating composition for precoated steel sheets as claimed in claim 5, wherein the acrylic polyol is a compound having at least two hydroxyl groups in one molecule and having a number average molecular weight of from 500 to 50000.

8. The coating composition for precoated steel sheets as claimed in claims 1, 2, 3 or 4, wherein the curing agent in iii) comprises an isocyanate compound and/or an amino resin.

9. The coating composition for precoated steel sheets as claimed in claim 8, wherein the isocyanate compound is a blocked isocyanate compound.

10. The coating composition for precoated steel sheets as claimed in claim 9, wherein the isocyanate compound that constitutes the blocked isocyanate compound is one selected from the group consisting of hexamethylene diisocyanate or its derivatives, tolylene diisocyanate or its derivatives, 4,4'-diphenylmethane diisocyanate or its derivatives, xylylene diisocyanate or its derivatives, isophorone diisocyanate or its derivatives, trimethylhexamethylene diisocyanate or its derivatives, hydrogenated tolylene diisocyanate or its derivatives, hydrogenated 4,4'-diphenylmethane diisocyanate or its derivatives, and hydrogenated xylylene diisocyanate or its derivatives.

11. The coating composition for precoated steel sheets as claimed in claim 8, which comprises an isocyanate compound as the curing agent and in which the ratio by mol of the isocyanato groups in the isocyanate compound to the hydroxyl groups in the polyester compound in i) and the polyol in ii), NCO/OH is from 0.8 to 1.2.

12. The coating composition for precoated steel sheets as claimed in claim 8, which comprises an amino resin as the curing agent and in which the ratio of the combination of the polyester compound in i) and the polyol in ii) to the amino resin, (polyester compound+polyol)/amino resin, is from 95/5 to 65/35, in terms of the ratio by weight of the solid contents of these.

13. The coating composition for precoated steel sheets as claimed in claim 1, 2, 3, or 4, wherein the polyol in ii) comprises a polyester polyol except the polyester compound in i), and/or an acrylic polyol, and the polyester polyol is a compound having at least two hydroxyl groups in one molecule and having a number average molecular weight of from 1000 to 50000.

14. The coating composition for precoated steel sheets as claimed in claim 1, 2, 3, or 4, wherein the polyol in ii) comprises a polyester polyol except the polyester compound in i), and/or an acrylic polyol, and the acrylic polyol is a compound having at least two hydroxyl groups in one molecule and having a number average molecular weight of from 500 to 50000.

15. The coating composition for precoated steel sheets as claimed in claim 1, 2, 3, or 4, wherein the polyol in ii) comprises a polyester polyol except the polyester compound in i), and/or an acrylic polyol, and the polyester polyol is a compound having at least two hydroxyl groups in one molecule and having a number average molecular weight of from 1000 to 50000, and the acrylic polyol is a compound having at least two hydroxyl groups in one molecule and having a number average molecular weight of from 500 to 50000.

16. The coating composition for precoated steel sheets as claimed in claim 1, 2, 3, or 4, wherein the polyol in ii) comprises a polyester polyol except the polyester compound in i), and/or an acrylic polyol, the polyester polyol is a compound having at least two hydroxyl groups in one molecule and having a number average molecular weight of from 1000 to 50000, and the curing agent in iii) comprises an isocyanate compound and/or an amino resin.

17. The coating composition for precoated steel sheets as claimed in claim 1, 2, 3, or 4, wherein the polyol in ii) comprises a polyester polyol except the polyester compound in i), and/or an acrylic polyol, the acrylic polyol is a compound having at least two hydroxyl groups in one molecule and having a number average molecular weight of from 500 to 50000, and the curing agent in iii) comprises an isocyanate compound and/or an amino resin.

18. The coating composition for precoated steel sheets as claimed in claim 1, 2, 3, or 4, wherein the polyol in ii) comprises a polyester polyol except the polyester compound in i), and/or an acrylic polyol, the polyester polyol is a compound having at least two hydroxyl groups in one molecule and having a number average molecular weight of from 1000 to 50000, and the acrylic polyol is a compound having at least two hydroxyl groups in one molecule and having a number average molecular weight of from 500 to 50000, and the curing agent in iii) comprises an isocyanate compound and/or an amino resin.

19. The coating composition for precoated steel sheets as claimed in claim 1, 2, 3, or 4, wherein the polyol in ii) comprises a polyester polyol except the polyester compound in i), and/or an acrylic polyol, the polyester polyol is a compound having at least two hydroxyl groups in one molecule and having a number average molecular weight of from 1000 to 50000, and the curing agent in iii) is a blocked isocyanate compound.

20. The coating composition for precoated steel sheets as claimed in claim 1, 2, 3, or 4, wherein the polyol in ii) comprises a polyester polyol except the polyester compound in i), and/or an acrylic polyol, the acrylic polyol is a compound having at least two hydroxyl groups in one molecule and having a number average molecular weight of from 500 to 50000, and the curing agent in iii) is a blocked isocyanate compound.

21. The coating composition for precoated steel sheets as claimed in claim 1, 2, 3, or 4, wherein the polyol in ii) comprises a polyester polyol except the polyester compound in i), and/or an acrylic polyol, the polyester polyol is a compound having at least two hydroxyl groups in one molecule and having a number average molecular weight of from 1000 to 50000, the acrylic polyol is a compound having at least two hydroxyl groups in one molecule and having a number average molecular weight of from 500 to 50000 and the curing agent in iii) is a blocked isocyanate compound.

22. The coating composition for precoated steel sheets as claimed in claim 19, wherein the isocyanate compound that constitutes the blocked isocyanate compound is one selected from the group consisting of hexamethylene diisocyanate or its derivatives, tolylene diisocyanate or its derivatives, 4,4'-diphenylmethane diisocyanate or its derivatives, xylylene diisocyanate or its derivatives, isophorone diisocyanate or its derivatives, trimethylhexamethylene diisocyanate or its derivatives, hydrogenated tolylene diisocyanate or its derivatives, hydrogenated 4,4'-diphenylmethane diisocyanate or its derivatives, and hydrogenated xylylene diisocyanate or its derivatives.

23. The coating composition for precoated steel sheets as claimed in claim 20, wherein the isocyanate compound that constitutes the blocked isocyanate compound is one selected from the group consisting of hexamethylene diisocyanate or its derivatives, tolylene diisocyanate or its derivatives, 4,4'-diphenylmethane diisocyanate or its derivatives, xylylene diisocyanate or its derivatives, isophorone diisocyanate or its derivatives, trimethylhexamethylene diisocyanate or its derivatives, hydrogenated tolylene diisocyanate or its derivatives, hydrogenated 4,4'-diphenylmethane diisocyanate or its derivatives, and hydrogenated xylylene diisocyanate or its derivatives.

24. The coating composition for precoated steel sheets as claimed in claim 21, wherein the isocyanate compound that constitutes the blocked isocyanate compound is one selected from the group consisting of hexamethylene diisocyanate or its derivatives, tolylene diisocyanate or its derivatives, 4,4'-diphenylmethane diisocyanate or its derivatives, xylylene diisocyanate or its derivatives, isophorone diisocyanate or its derivatives, trimethylhexamethylene diisocyanate or its derivatives, hydrogenated tolylene diisocyanate or its derivatives, hydrogenated 4,4'-diphenylmethane diisocyanate or its derivatives, and hydrogenated xylylene diisocyanate or its derivatives.

25. The coating composition for precoated steel sheets as claimed in claim 16, which comprises an isocyanate compound as the curing agent and in which the ratio by mol of the isocyanato groups in the isocyanate compound to the hydroxyl groups in the polyester compound in i) and the polyol in ii), NCO/OH, is from 0.8 to 1.2.

26. The coating composition for precoated steel sheets as claimed in claim 17, which comprises an isocyanate compound as the curing agent and in which the ratio by mol of the isocyanato groups in the isocyanate compound to the hydroxyl groups in the polyester compound in i) and the polyol in ii), NCO/OH, is from 0.8 to 1.2.

27. The coating composition for precoated steel sheets as claimed in claim 18, which comprises an isocyanate compound as the curing agent and in which the ratio by mol of the isocyanato groups in the isocyanate compound to the hydroxyl groups in the polyester compound in i) and the polyol in ii), NCO/OH, is from 0.8 to 1.2.

28. The coating composition for precoated steel sheets as claimed in claim 19, which comprises an isocyanate compound as the curing agent and in which the ratio by mol of the isocyanato groups in the isocyanate compound to the hydroxyl groups in the polyester compound in i) and the polyol in ii), NCO/OH, is from 0.8 to 1.2.

29. The coating composition for precoated steel sheets as claimed in claim 20, which comprises an isocyanate compound as the curing agent and in which the ratio by mol of the isocyanato groups in the isocyanate compound to the hydroxyl groups in the polyester compound in i) and the polyol in ii), NCO/OH, is from 0.8 to 1.2.

30. The coating composition for precoated steel sheets as claimed in claim 21, which comprises an isocyanate compound as the curing agent and in which the ratio by mol of the isocyanato groups in the isocyanate compound to the hydroxyl groups in the polyester compound in i) and the polyol in ii), NCO/OH, is from 0.8 to 1.2.

31. The coating composition for precoated steel sheets as claimed in claim 22, wherein the ratio by mol of the isocyanato groups in the isocyanate compound to the hydroxyl groups in the polyester compound in i) and the polyol in ii), NCO/OH, is from 0.8 to 1.2.

32. The coating composition for precoated steel sheets as claimed in claim 16, which comprises an amino resin as the curing agent and in which the ratio of the combination of the polyester compound in i) and the polyol in ii) to the amino resin, (polyester compound+polyol)/amino resin, is from 95/5 to 65/35, in terms of the ratio by weight of the solid contents of these.

33. The coating composition for precoated steel sheets as claimed in claim 17, which comprises an amino resin as the curing agent and in which the ratio of the combination of the polyester compound in i) and the polyol in ii) to the amino resin, (polyester compound+polyol)/amino resin, is from 95/5 to 65/35, in terms of the ratio by weight of the solid contents of these.

34. The coating composition for precoated steel sheets as claimed in claim 18, which comprises an amino resin as the curing agent and in which the ratio of the combination of the polyester compound in i) and the polyol in ii) to the amino resin, (polyester compound+polyol)/amino resin, is from 95/5 to 65/35, in terms of the ratio by weight of the solid contents of these.

35. A method for producing a precoated steel sheet, which comprises applying a coating composition as claimed in claim 1 onto a steel sheet or a plated steel sheet to form a coating film thereon.

36. The method for producing a precoated steel sheet as claimed in claim 35, wherein the steel sheet or the plated steel sheet onto which the coating composition is applied is surface-treated and/or undercoated with a primer.

37. A precoated steel sheet having a coating film formed from a coating composition as claimed in claim 1.

38. The precoated steel sheet as claimed in claim 37, wherein the substrate is a steel sheet or a plated steel sheet, and the steel sheet or the plated steel sheet is surface-treated and/or undercoated with a primer.

39. The coating composition for precoated steel sheets as claimed in claim 23, wherein the ratio by mol of the isocyanato groups in the isocyanate compound to the hydroxyl groups in the polyester compound in i) and the polyol in ii), NCO/OH, is from 0.8 to 1.2.

40. The coating composition for precoated steel sheets as claimed in claim 24, wherein the ratio by mol of the isocyanato groups in the isocyanate compound to the hydroxyl groups in the polyester compound in i) and the polyol in ii), NCO/OH, is from 0.8 to 1.2.

* * * * *